United States Patent [19]
Canfield et al.

[11] Patent Number: 6,123,454
[45] Date of Patent: Sep. 26, 2000

[54] TYMPANIC THERMOMETER DISPOSABLE PROBE COVER WITH FURTHER STRETCHING PREVENTION STRUCTURE

[75] Inventors: Eric L. Canfield, Chester Springs; Edward P. Cheslock, Delta; John R. Woolford, West Chester, all of Pa.

[73] Assignee: TruTek, Inc., Chadds Ford, Pa.

[21] Appl. No.: 09/330,172

[22] Filed: Jun. 11, 1999

[51] Int. Cl.[7] .................................................. G01K 1/08
[52] U.S. Cl. ........................... 374/158; 374/209; 600/559
[58] Field of Search ..................................... 374/158, 209; 600/549, 310, 559

[56] References Cited

U.S. PATENT DOCUMENTS

| | | |
|---|---|---|
| Re. 34,507 | 1/1994 | Egawa et al. . |
| Re. 34,599 | 5/1994 | Susyznski et al. . |
| Re. 34,789 | 11/1994 | Fraden . |
| D. 218,851 | 9/1970 | Sato . |
| D. 246,766 | 12/1977 | Everest . |
| D. 254,959 | 5/1980 | Everest . |
| D. 300,728 | 4/1989 | Ross . |
| D. 303,008 | 8/1989 | O'Hara et al. . |
| D. 317,414 | 6/1991 | Lanci et al. . |
| D. 318,812 | 8/1991 | Matsuura et al. . |
| D. 321,487 | 11/1991 | Manno . |

(List continued on next page.)

FOREIGN PATENT DOCUMENTS

| | | |
|---|---|---|
| 66021/86 | of 0000 | Australia . |
| 778199 | 2/1972 | Belgium . |
| 1258052 | 8/1989 | Canada . |
| 1265355 | 2/1990 | Canada . |
| 1314407 | 3/1993 | Canada . |
| 0098402 | 1/1984 | European Pat. Off. . |
| 0445783A2 | 9/1991 | European Pat. Off. . |
| 0674162A2 | 9/1995 | European Pat. Off. . |
| 0715359A1 | 6/1996 | European Pat. Off. . |
| 2167973 | 8/1973 | France . |

(List continued on next page.)

OTHER PUBLICATIONS

J. W. Moore et al., "Noncontact tympanic thermometer", *Medical & Biological Engineering & Computing*, vol. 16, No. 5, Sep. 1978, pp. 580–584.

D. E. Lees et al., "Noninvasive Determination of Core Temperature During Anesthesia", *Southern Medical Journal*, vol. 73, No. 10, Oct. 1980, pp. 1322–1324.

J. Fraden et al., "Application of Pyro–Electric Polymer Film to Medical Thermometry," *Proceedings of the Eighth Annual Conference of the IEEE/Engineering in Medicine and Biology Society*, 86CH2368.9, vol. 3 of 3, Fort Worth, Texas, Nov. 7–10, 1986.

J. Fraden, "Application of Piezo/Pyroelectric Films in Medical Transducers," *Journal of Chemical Engineering*, vol. 13, No. 3, Mar./Apr. 1988, pp. 133–138.

(List continued on next page.)

*Primary Examiner*—Diego Gutierrez
*Assistant Examiner*—Lydia M. De Jesús
*Attorney, Agent, or Firm*—Nixon & Vanderhye P.C.

[57] ABSTRACT

In a tympanic thermometer probe cover including a film, an additional, substantially non-stretchable structure is mechanically coupled to the film in the area where the probe contacts the film. This additional structure is designed so that it does not occlude infrared radiation from reaching the probe while maintaining the portion of the film over the probe distal end in a prestretched, wrinkle-free condition and preventing that portion of the film from stretching further. The structure may comprise a concentric registration ring that is adhered to the film. The registration ring includes a central open hole portion through which infrared radiation may pass without occlusion. The ring self-adheres to the film, maintaining the film in a prestretched, wrinkle-free condition. When the probe cover is applied to the probe, the probe contacts the ring. Since the ring is substantially non-stretchable, the ring prevents the film from further stretching over the probe. The film and the ring may be fabricated as a single polyethylene, silicone, foam or other infra-red transparent window-type material.

22 Claims, 15 Drawing Sheets

U.S. PATENT DOCUMENTS

| | | |
|---|---|---|
| D. 329,389 | 9/1992 | Hines . |
| D. 329,395 | 9/1992 | Mackay . |
| D. 329,396 | 9/1992 | Mackay . |
| D. 336,862 | 6/1993 | Ayton et al. . |
| D. 337,534 | 7/1993 | Swift . |
| D. 337,954 | 8/1993 | Makita et al. . |
| D. 338,412 | 8/1993 | Curbbun . |
| D. 342,681 | 12/1993 | Mackay . |
| D. 370,860 | 6/1996 | Pompei et al. . |
| 738,960 | 9/1903 | Vaughan et al. . |
| 1,363,259 | 12/1920 | Mills . |
| 2,696,117 | 12/1954 | Harrison . |
| 2,804,069 | 8/1957 | Schwamm et al. . |
| 2,844,031 | 7/1958 | Rosenthal . |
| 2,848,998 | 8/1958 | Bryan . |
| 2,877,500 | 3/1959 | Rainer et al. . |
| 2,904,480 | 9/1959 | Rainer et al. . |
| 2,969,141 | 1/1961 | Katzin . |
| 2,972,991 | 2/1961 | Burke . |
| 3,023,398 | 2/1962 | Siegert . |
| 3,054,397 | 9/1962 | Benzinger . |
| 3,156,117 | 11/1964 | Benzinger . |
| 3,179,805 | 4/1965 | Astheimer . |
| 3,190,436 | 6/1965 | Diamant . |
| 3,193,978 | 7/1965 | Bader . |
| 3,234,593 | 2/1966 | Lerner et al. . |
| 3,277,715 | 10/1966 | Vanderschmidt . |
| 3,282,106 | 11/1966 | Barnes . |
| 3,301,394 | 1/1967 | Baermann et al. . |
| 3,335,715 | 8/1967 | Hugenholtz et al. . |
| 3,349,896 | 10/1967 | Ensign et al. . |
| 3,367,186 | 2/1968 | Ensign et al. . |
| 3,368,076 | 2/1968 | Clifford . |
| 3,465,149 | 9/1969 | Flint . |
| 3,469,449 | 9/1969 | Keller . |
| 3,469,685 | 9/1969 | Baermann . |
| 3,491,596 | 1/1970 | Dean . |
| 3,500,280 | 3/1970 | Ensign . |
| 3,507,153 | 4/1970 | Jones et al. . |
| 3,526,135 | 9/1970 | Wortz . |
| 3,531,642 | 9/1970 | Barnes et al. . |
| 3,531,992 | 10/1970 | Moore . |
| 3,581,570 | 6/1971 | Wortz . |
| 3,605,750 | 9/1971 | Sheridan et al. . |
| 3,626,757 | 12/1971 | Benzinger . |
| 3,641,345 | 2/1972 | Coackley et al. . |
| 3,650,153 | 3/1972 | Schwab . |
| 3,653,263 | 4/1972 | Poole et al. . |
| 3,663,917 | 5/1972 | Mahmoodi . |
| 3,673,868 | 7/1972 | Beury, III et al. . |
| 3,678,751 | 7/1972 | Mead et al. . |
| 3,681,991 | 8/1972 | Eberly, Jr. . |
| 3,701,347 | 10/1972 | Belkin . |
| 3,703,892 | 11/1972 | Meyers . |
| 3,719,396 | 3/1973 | VanDeWalker et al. . |
| 3,724,448 | 4/1973 | Lima . |
| 3,729,998 | 5/1973 | Mueller et al. . |
| 3,735,864 | 5/1973 | Eckhart . |
| 3,738,172 | 6/1973 | Sato . |
| 3,738,173 | 6/1973 | Sato . |
| 3,738,479 | 6/1973 | Sato . |
| 3,738,892 | 6/1973 | Curcio . |
| 3,742,191 | 6/1973 | Poole et al. . |
| 3,750,471 | 8/1973 | Bremer . |
| 3,777,568 | 12/1973 | Risgin et al. . |
| 3,781,748 | 12/1973 | Bishop et al. . |
| 3,781,837 | 12/1973 | Anderson et al. . |
| 3,798,366 | 3/1974 | Hunt et al. . |
| 3,809,228 | 5/1974 | Fowler et al. . |
| 3,809,229 | 5/1974 | Wahlig . |
| 3,809,920 | 5/1974 | Cohen et al. . |
| 3,812,847 | 5/1974 | Moore et al. . |
| 3,812,897 | 5/1974 | Latinen . |
| 3,822,593 | 7/1974 | Oudewaal . |
| 3,822,598 | 7/1974 | Brothers et al. . |
| 3,832,669 | 8/1974 | Mueller et al. . |
| 3,833,115 | 9/1974 | Schapker . |
| 3,834,238 | 9/1974 | Mueller et al. . |
| 3,838,600 | 10/1974 | Ersek et al. . |
| 3,849,530 | 11/1974 | Wyeth et al. . |
| 3,851,029 | 11/1974 | Cornett, III et al. . |
| 3,878,836 | 4/1975 | Twentier . |
| 3,880,282 | 4/1975 | Naumann . |
| 3,929,018 | 12/1975 | Turner . |
| 3,942,891 | 3/1976 | Spielberger et al. . |
| 3,949,740 | 4/1976 | Twentier . |
| 3,987,899 | 10/1976 | Vyprachticky . |
| 3,999,434 | 12/1976 | Yen . |
| 3,999,537 | 12/1976 | Noiles . |
| 4,005,605 | 2/1977 | Michael . |
| 4,022,855 | 5/1977 | Hamblen . |
| 4,024,397 | 5/1977 | Weiner . |
| 4,054,057 | 10/1977 | Kluge . |
| 4,061,226 | 12/1977 | Essen . |
| 4,062,239 | 12/1977 | Fowler et al. . |
| 4,081,678 | 3/1978 | Macall . |
| 4,091,922 | 5/1978 | Egler . |
| 4,117,926 | 10/1978 | Turner et al. . |
| 4,148,304 | 4/1979 | Mull . |
| 4,159,766 | 7/1979 | Kluge . |
| 4,166,389 | 9/1979 | Montren . |
| 4,166,454 | 9/1979 | Meijer . |
| 4,168,626 | 9/1979 | Fullager . |
| 4,183,248 | 1/1980 | West . |
| 4,191,197 | 3/1980 | Benzinger . |
| 4,193,396 | 3/1980 | Wacker . |
| 4,197,944 | 4/1980 | Catlin . |
| 4,201,222 | 5/1980 | Haase . |
| 4,226,910 | 10/1980 | Dahlen et al. . |
| 4,233,512 | 11/1980 | Rupert . |
| 4,241,828 | 12/1980 | Bourdelle et al. . |
| 4,271,358 | 6/1981 | Schwarz . |
| 4,275,591 | 6/1981 | Wand . |
| 4,297,685 | 10/1981 | Brainard, II . |
| 4,301,682 | 11/1981 | Everest . |
| 4,312,357 | 1/1982 | Andersson et al. . |
| 4,315,150 | 2/1982 | Darringer et al. . |
| 4,341,992 | 7/1982 | Goldstein . |
| 4,343,182 | 8/1982 | Pompei . |
| 4,343,185 | 8/1982 | Knute . |
| 4,350,166 | 9/1982 | Mobarry . |
| 4,351,616 | 9/1982 | Farnstrom et al. . |
| 4,362,166 | 12/1982 | Furler et al. . |
| 4,372,690 | 2/1983 | Berman et al. . |
| 4,378,489 | 3/1983 | Chabinsky et al. . |
| 4,379,971 | 4/1983 | Smith et al. . |
| 4,380,998 | 4/1983 | Kieffer, III et al. . |
| 4,392,005 | 7/1983 | Mohrman . |
| 4,400,341 | 8/1983 | Sorensen . |
| 4,414,980 | 11/1983 | Mott . |
| 4,420,265 | 12/1983 | Everest et al. . |
| 4,425,921 | 1/1984 | Fujisaki et al. . |
| 4,433,924 | 2/1984 | Quinn, III . |
| 4,436,438 | 3/1984 | Voznick . |
| 4,454,370 | 6/1984 | Viznick . |
| 4,456,390 | 6/1984 | Junkert et al. . |
| 4,457,633 | 7/1984 | Andrews . |
| 4,471,354 | 9/1984 | Smith . |
| 4,475,554 | 10/1984 | Hyndman . |
| 4,481,417 | 11/1984 | Inglee . |
| 4,487,208 | 12/1984 | Kamens . |
| 4,493,564 | 1/1985 | Epstein . |

| | | |
|---|---|---|
| 4,494,881 | 1/1985 | Everest . |
| 4,509,522 | 4/1985 | Manuccia et al. . |
| 4,510,115 | 4/1985 | Gokcen et al. . |
| 4,515,165 | 5/1985 | Carroll . |
| 4,524,779 | 6/1985 | Brown, Jr. . |
| 4,527,896 | 7/1985 | Irani et al. . |
| 4,537,791 | 8/1985 | Tarjan . |
| 4,566,808 | 1/1986 | Pompei et al. . |
| 4,572,365 | 2/1986 | Bruno et al. . |
| 4,588,306 | 5/1986 | Burger et al. . |
| 4,602,642 | 7/1986 | O'Hara et al. . |
| 4,607,963 | 8/1986 | Ulrickson . |
| 4,614,442 | 9/1986 | Poncy . |
| 4,619,271 | 10/1986 | Burger et al. . |
| 4,626,686 | 12/1986 | Pompei et al. . |
| 4,634,294 | 1/1987 | Christol et al. . |
| 4,636,091 | 1/1987 | Pompei et al. . |
| 4,644,163 | 2/1987 | Selander . |
| 4,652,145 | 3/1987 | Bjornberg . |
| 4,659,234 | 4/1987 | Brouwer . |
| 4,662,360 | 5/1987 | O'Hara et al. . |
| 4,679,949 | 7/1987 | Sakamoto . |
| 4,684,018 | 8/1987 | Jarund . |
| 4,691,712 | 9/1987 | Brown, Jr. . |
| 4,727,500 | 2/1988 | Jackson et al. . |
| 4,763,522 | 8/1988 | Pompei . |
| 4,765,752 | 8/1988 | Beynon et al. . |
| 4,784,149 | 11/1988 | Berman et al. . |
| 4,790,324 | 12/1988 | O'Hara et al. . |
| 4,797,840 | 1/1989 | Fraden . |
| 4,801,212 | 1/1989 | Imura . |
| 4,823,949 | 4/1989 | Bala . |
| 4,831,258 | 5/1989 | Paulk et al. . |
| 4,854,730 | 8/1989 | Fraden . |
| 4,859,079 | 8/1989 | Wickersheim et al. . |
| 4,863,281 | 9/1989 | Suszynski . |
| 4,874,253 | 10/1989 | Pompei et al. . |
| 4,895,164 | 1/1990 | Wood . |
| 4,900,162 | 2/1990 | Beckman et al. . |
| 4,907,895 | 3/1990 | Everest . |
| 4,911,559 | 3/1990 | Meyst et al. . |
| 4,914,673 | 4/1990 | Imura . |
| 4,919,505 | 4/1990 | Bartosiak et al. . |
| 4,932,789 | 6/1990 | Egawa et al. . |
| 4,955,980 | 9/1990 | Masuo . |
| 4,986,672 | 1/1991 | Beynon . |
| 4,993,419 | 2/1991 | Pompei et al. . |
| 4,993,424 | 2/1991 | Suszysnki et al. . |
| 5,001,657 | 3/1991 | Yagura et al. . |
| 5,011,296 | 4/1991 | Bartosiak et al. . |
| 5,012,813 | 5/1991 | Pompei et al. . |
| 5,017,018 | 5/1991 | Iuchi et al. . |
| 5,017,019 | 5/1991 | Pompei . |
| 5,018,872 | 5/1991 | Suszynski et al. . |
| 5,024,533 | 6/1991 | Egawa et al. . |
| 5,031,619 | 7/1991 | Pompei . |
| 5,046,482 | 9/1991 | Everest . |
| 5,051,590 | 9/1991 | Kern et al. . |
| 5,051,595 | 9/1991 | Kern et al. . |
| 5,054,936 | 10/1991 | Fraden . |
| 5,056,682 | 10/1991 | Meyst et al. . |
| 5,066,142 | 11/1991 | DeFrank et al. . |
| 5,081,359 | 1/1992 | Pompei . |
| 5,081,998 | 1/1992 | Yelderman et al. . |
| 5,088,834 | 2/1992 | Howe et al. . |
| 5,094,544 | 3/1992 | Ignatowicz . |
| 5,127,742 | 7/1992 | Fraden . |
| 5,150,969 | 9/1992 | Goldberg et al. . |
| 5,153,563 | 10/1992 | Goto et al. . |
| 5,159,936 | 11/1992 | Yelderman et al. . |
| 5,163,418 | 11/1992 | Fraden et al. . |
| 5,167,235 | 12/1992 | Seacord et al. . |

| | | | |
|---|---|---|---|
| 5,169,235 | 12/1992 | Tominaga et al. . | |
| 5,172,978 | 12/1992 | Nomura et al. . | |
| 5,178,464 | 1/1993 | Fraden . | |
| 5,179,936 | 1/1993 | O'Hara et al. . | |
| 5,183,337 | 2/1993 | Pompei . | |
| 5,188,459 | 2/1993 | Mino et al. . | |
| 5,199,436 | 4/1993 | Pompei et al. . | |
| 5,229,612 | 7/1993 | Pompei et al. . | |
| 5,232,284 | 8/1993 | Egawa et al. . | |
| 5,264,375 | 11/1993 | Bang et al. . | |
| 5,271,407 | 12/1993 | Pompei et al. . | |
| 5,292,347 | 3/1994 | Pompei . | |
| 5,293,862 | 3/1994 | O'Hara et al. . | |
| 5,293,877 | 3/1994 | O'Hara et al. . | |
| 5,313,951 | 5/1994 | Zhao . | |
| 5,319,202 | 6/1994 | Pompei . | |
| 5,325,863 | 7/1994 | Pompei . | |
| 5,333,784 | 8/1994 | Pompei . | |
| 5,340,215 | 8/1994 | Makita et al. . | |
| 5,352,038 | 10/1994 | Schmidt et al. . | |
| 5,352,039 | 10/1994 | Barral et al. . | |
| 5,358,333 | 10/1994 | Schmidt et al. . | |
| 5,368,038 | 11/1994 | Fraden . | |
| 5,381,796 | 1/1995 | Pompei . | |
| 5,388,907 | 2/1995 | Aoyama et al. . | |
| 5,391,001 | 2/1995 | Rupert et al. . | |
| 5,404,125 | 4/1995 | Mori et al. . | |
| 5,411,032 | 5/1995 | Esseff et al. . | |
| 5,445,158 | 8/1995 | Pompei . | |
| 5,458,121 | 10/1995 | Harada . | |
| 5,469,855 | 11/1995 | Pompei et al. . | |
| 5,479,931 | 1/1996 | Mooradian . | |
| 5,487,607 | 1/1996 | Makita et al. . | |
| 5,515,847 | 5/1996 | Braig et al. . | |
| 5,516,010 | 5/1996 | O'Hara et al. . | |
| 5,522,662 | 6/1996 | Shiokawa . | |
| 5,528,041 | 6/1996 | Pompei . | |
| 5,609,564 | 3/1997 | Makita et al. . | |
| 5,645,350 | 7/1997 | Tang . | |
| 5,707,343 | 1/1998 | O'Hara et al. . | |
| 5,795,067 | 8/1998 | Fraden et al. | 374/158 |
| 5,833,367 | 11/1998 | Cheslock et al. | 374/158 |
| 5,980,451 | 11/1999 | O'Hara et al. | 128/9 |

FOREIGN PATENT DOCUMENTS

| | | |
|---|---|---|
| 2343234 | 9/1977 | France . |
| 4422974A1 | 1/1995 | Germany . |
| 1960421A1 | 8/1997 | Germany . |
| 55-154426 | 12/1980 | Japan . |
| 56-161134 | 12/1981 | Japan . |
| 56-167428 | 12/1981 | Japan . |
| 57-35739 | 2/1982 | Japan . |
| 57-35740 | 2/1982 | Japan . |
| 57-35741 | 2/1982 | Japan . |
| 57-212039 | 12/1982 | Japan . |
| 59-135439 | 9/1984 | Japan . |
| 60-187829 | 9/1985 | Japan . |
| 100319 | 6/1987 | Japan . |
| 147818 | 11/1962 | U.S.S.R. . |
| 1425765 | 2/1976 | United Kingdom . |
| 1518521 | 7/1978 | United Kingdom . |
| WO93/03666 | 3/1993 | WIPO . |
| WO93/19662 | 10/1993 | WIPO . |
| WO95/14913 | 6/1995 | WIPO . |
| WO95/18961 | 7/1995 | WIPO . |
| WO96/07877 | 3/1996 | WIPO . |
| WO96/19938 | 7/1996 | WIPO . |

OTHER PUBLICATIONS

J.M. Looney, Jr. et al., "Ear Thermometry," *Medical Electronics*, Jun. 1989.

M. Benzinger et al., "Tympanic Clinical Temperature," presented at the Fifth Symposium on Temperature, Washington, D.C., Jun. 21–24, 1971, sponsored by the National Bureau of Standards, American Institute of Physics, and Instrument Society of America.

Information Sheet, Model 1M, Thermopile Detector, Dexter Research Center, 2 pages, Oct. 1980, Michigan.

Information Sheet, Model 2M, Thermopile Detector, Dexter Research Center, 2 pages, Oct. 1980, Michigan.

Information Sheet, Model M5, Thermopile Detector, Dexter Research Center, 2 pages, Oct. 1980, Michigan.

Information Sheet, Model DR26, Dual Element Thermopile Detector, Dexter Research Center, 3 pages, Oct. 1980, Michigan.

Information Sheet, Model DR46, Thermopile Detector, Dexter Research Center, 1 page, Oct. 1979, Michigan.

Information Sheet, Model 1010, Low Noise Amplifier, Dexter Research Center, 2 pages, Oct. 1980, Michigan.

Dexter Research Center, Inc., Product Price List—Domestic, 1–1–83.

Y. Houdas, et al., "Human Body Temperature, Its Measurement and Regulation," p. 83, Plemum Press, New York and London, No Date.

Advertisement, "Optical Calibration," Det Tronics, Sunnyvale, CA, *InTech*, p. 48, Oct. 1987.

P. Gaudet, "Omega Tympanic Infrared Temperature Measuring Instrument, Product Specification," Exergen Corporation, pp. 1–3, No Date.

ASTM Designation: E 1112–86 (Reapproved 1991), "Standard Specification for Electronic Thermometer for Intermittent Determination of Patient Temprature," pp. 1–4 (Reprinted from the Annual Book of ASTM Standards, Philadelphia, PA).

"Electronic Thermometers," *Medical Electronics*, Jun. 1996, pp. 118–120.

Schieferdecker, J., et al., "Infrared thermopile sensors with high sensitivity and very low temperature coefficient," *Sensors and Actuators* A 46–47 (1995) 422–427 (printed in the Netherlands).

P.C. Lanchester, "Digital thermometer circuit for silicon diode sensors," *Cryogenics* 1989 vol. 29 Dec., (Received May 30, 1989), Southampton, UK, pp.1156–1159.

Trial Exhibit list from Thermoscan, Inc. V. Sherwood Medical Co, No date.

TYMPANIC THERMOMETER DISPOSABLE PROBE COVER WITH FURTHER STRETCHING PREVENTION STRUCTURE

FIELD OF THE INVENTION

This invention relates to disposable probe covers for tympanic thermometers that measure temperature by sensing the radiant energy given off by the eardrum ("tympanic membrane").

BACKGROUND AND SUMMARY OF THE INVENTION

Ear thermometers have become more common in recent years, replacing mercury and electronic oral thermometers in many clinical and home situations. Ear thermometers work by measuring the temperature of the eardrum (since the medical term for eardrum is "tympanic membrane," these thermometers are sometimes called "tympanic thermometers"). Why the eardrum? The carotid artery that supplies blood to the hypothalamus—the body's temperature control center—passes through the eardrum. Therefore, the temperature of your eardrum corresponds very closely to the core temperature of your body.

Ear or "tympanic" thermometers receive and analyze the radiant heat ("infrared") energy coming from the eardrum. Just as you can feel the heat when you hold your hands up in front of a fire, a tympanic thermometer can detect eardrum temperature without having to actually touch the eardrum by receiving the radiant heat energy coming from the eardrum.

Commercially available tympanic thermometers include a handheld probe device containing a "thermopile" or pyroelectric heat sensor. The sensing probe typically has a tapered or cone shape for easy insertion into the outer ear canal. The heat sensor within the probe picks up the eardrum's radiant heat energy. Microelectronics can determine eardrum temperature from the heat sensor's electrical output.

Most commercially available tympanic thermometers are designed to work with disposable probe covers. Most of these disposable probe covers cover the end of the probe during use with a film such as polyethylene. The film is substantially transparent to infrared radiation but impervious to moisture, ear wax and germs. A different probe cover is used for each patient. Probe covers minimize the risk of spreading disease, and also promote cleanliness and accuracy by preventing ear wax and other secretions from contacting the probe.

A thin film tends to be substantially transparent to the radiation emitted by the eardrum. However, wrinkles in the film can affect its transmissivity. Because the wrinkling pattern may be different from one particular probe cover specimen to another, it is difficult to compensate electronically for wrinkling in the field during the thermometer manufacturing calibration process. It is therefore desirable to eliminate wrinkling as much as possible.

FIGS. 1A–1G show some examples of prior art tympanic thermometer probe covers. These different probe cover designs handle the wrinkling issue in different ways.

The FIG. 1A prior art probe cover 10 is made by Thermoscan, Inc. of San Diego Calif. and comes in a box marked with "U.S. Pat. No. 5,088,834". This probe cover 10 is made out of a single unitary piece of thin, lightweight, semi-rigid, stiff hollow translucent plastic material shaped into a cone 12. The cone 12 includes a thicker "shank" portion 18, and terminates in a thinner end portion 13 comprising an integral piece of thin plastic film 14 that is impervious to moisture but transparent to (and does not absorb) radiant heat energy at the infrared wavelengths emitted by the eardrum. The FIG. 1A one-piece probe cover 10 is designed to be inserted over a correspondingly cone-shaped probe. A surrounding retaining ring base 16 retains cover 10 on the probe during use. When cover 10 is inserted over the probe, plastic film 14 is stretched tightly over the end of the probe to provide a thin, wrinkle-free film "window" that is substantially transparent to infrared radiant energy. The conically shaped stiff "shank" portion 18 of cover 10 tapers to glide into the passageway of a person's ear leading to the eardrum—thus helping to position the probe relative to the eardrum. This stiff construction also allows probe covers 10 to be stacked one inside another for compact shipment.

FIG. 1B shows a prior art probe cover 20 sold by Sherwood Medical Co. This design is explained in U.S. Pat. Nos. 5,980,451; 5,707,343; 5,516,010; 5,293,862; 5,179,936; 4,790,324; 4,662,360 and 4,602,642, and possibly also in a still-pending continuing applications. The FIG. 1B probe cover 20 is intended for use with a tympanic thermometer that senses infrared radiation in an external ear canal of a patient via an IR sensing probe. The IR sensing probe has a forward end, and the thermometer contains an IR sensor spaced from said forward end. The disposable probe cover 20 is said to include a stretchable thin film membrane 28 made of a material which is substantially transparent to IR radiation over a predetermined range of wavelengths. A body portion 22 is said to have an opening sized for having the IR sensing probe inserted therethrough. The thin film membrane 28 is said to extend across the opening in the body portion 22 in an unstretched condition. The membrane 28 is said to be stretchable to remove structural characteristics in the membrane that would interfere with measurement accuracy when the IR sensing probe is inserted through said opening.

To use the FIG. 1B probe cover 20, membrane 28 is positioned adjacent the forward end of the probe of the tympanic thermometer. The membrane 28 is stretched a predetermined amount across the forward end of the probe to remove structural characteristics in the membrane that would interfere with measurement accuracy. The membrane 28 is held stretched over the forward end of the probe, and the forward end of the probe is partially inserted into an external ear canal of a patient with the membrane stretched over the forward end of the probe. The stretched membrane 28 provides a barrier between the patient's external ear canal and the probe of the tympanic thermometer while permitting infrared radiation emitted in the external ear canal to be received by the probe.

The probe cover 30 shown in FIGS. 1C and 1D is manufactured by Welch Allyn Diatek, Inc. of San Diego, Calif. for use with Diatek's InstaTemp Model 9000 tympanic thermometer. See U.S. Pat. No. Re. 34,599. This probe cover 30 is designed to be used with a temperature sensing "gun" also manufactured by Diatek (see U.S. Pat. No. 4,863,281). This probe cover 30 includes a flat paper carrier 32 that supports a piece of transparent polyethylene sheet 34. Sheet 34 is nominally about 0.0005" to 0.001" thick. Sheet 34 is unstretched prior to application on the probe. However, sheet 34 is stretchable, and completely envelopes the probe when cover 30 is placed over the probe—stretching tightly over the probe so as to provide a radiation-transparent film layer between the probe and the patient's ear. Probe cover 30 is automatically dispensed from a vacu-formed plastic cartridge and applied onto the probe during a "cocking" action of the thermometer. The FIG. 1C design has several advantages, including inexpensive construction, flat storage, and stackability.

FIG. 1E represents another prior art probe cover 40 manufactured by Exergen Corp. of Newton, Mass. and comes in packages marked "U.S. Pat. No. 4,993,419." This disposable probe cover 40 comprises a film sheet 42 that is dispensed in a pre-perforated roll. In use, the nurse inserts a pin portion of the ear thermometer positioned opposite the probe into a first ring hole 44, and then wraps film 42 around the front of the probe and continues wrapping until a second ring hold 46 is aligned with the same pin portion. The nurse can then tear sheet 42 from the rest of the roll along the line of perforations 48. Ring holes 44, 46 retain sheet 42 on the probe during measurement. Although probe cover 40 is inexpensive to manufacture, it is difficult for a nurse to position properly onto the probe. In addition, the FIG. 1E probe cover 40 may not always reliably wrap around the front portion of the probe—creating wrinkles that can affect measuring accuracy. The FIG. 1E probe cover 40 can also slip off the probe without the nurse noticing.

FIG. 1F shows a probe cover 90 manufactured by Alaris' IVAC Corporation for the CoreCheck Model 2090 tympanic thermometer (see U.S. Pat. No. 5,066,142). Probe cover 80 includes a rectangular cardboard carrier 92 defining a central circular hole 93. A polyethylene sheet 94 is adhered to cardboard carrier 92 to provide a more or less wrinkle-free window through which infrared radiation may pass. Probe cover 90 is manually slid from a dispenser which holds up to 100 probe covers, onto a platen. In use, the tympanic thermometer probe is pressed through sheet 94 within central circular hole 93 while the platen holds carrier 92 in place. Sheet 94 further stretches over the probe end during this application process, adhering to the conical thermometer.

FIG. 1G shows a still different prior art probe cover design of the present assignee, described in U.S. Pat. No. 5,833,367 (and see also U.S. Pat. No. 5,066,142). This design provides a hollow, tubular body 60 made out of foam. Body 60 terminates in an opening 56. A plastic sheet 58 is prestretched over opening 56 to provide a wrinkle-free window. A narrower portion 50 of the foam body 60 prevents probe 68 from contacting sheet 58 when the probe is inserted into the body. In use, insertion of probe 68 into body 60 may cause the body to expand and sheet 58 to stretch further. Foam body 60 frictionally engages the outer surface 66a of probe 66 to keep the probe cover on the end of the probe without need for any additional retaining mechanism.

For all of the probe covers shown in FIGS. 1A–1G, insertion of the sensing probe into the probe cover causes a plastic sheet to stretch. For the probe covers shown in FIGS. 1A–1E, a plastic sheet goes from an unstretched condition to a stretched condition. For the probe covers shown in FIGS. 1F and 1G, the sheet goes from a prestretched condition to a further stretched condition. In all cases but the FIG. 1G probe cover, the plastic sheet is stretched over the probe end.

Stretching the plastic sheet or film upon application of the probe cover to a probe can cause problems. For example, one common problem is tearing of the sheet or film. There is a risk of cross-contamination if the sheet tears. There is also a risk that ear wax or other secretions will get on the lens commonly found at the extreme forward end of the probe. Such substances can partially occlude the sensing probe optical path, leading to inaccurate temperature measurements. Despite manufacturers' efforts to educate clinicians to clean the lens, few clinicians actually perform this task.

Another problem with stretching the plastic sheet or film over the probe is that the sheet will tend to adhere to the probe. This can make it more difficult to strip off the probe cover after a measurement.

Still another problem is that stretching the plastic sheet in the field leads to different amounts of stretching depending on the technique a nurse or other care-giver uses to apply the probe cover to the probe. For example, certain of these probe covers are stretched by an amount that depends on the clinician's application of uncontrolled force levels during probe cover application. Non-uniform or non-consistent stretching can lead to measurement inaccuracies.

Thus, while substantial work has been done in the past in this area, further improvements are possible.

The present invention solves these problems by providing a plastic sheet that is prestretched and does not stretch further upon application of the probe cover to the probe.

In accordance with the present invention, a substantially non-stretchable structure is provided on or adhered to the film in the area where the probe contacts the film. This additional structure is designed so that it does not occlude infrared radiation from reaching the probe while maintaining the film in a prestretched, wrinkle-free condition and preventing the film from stretching further.

In one particular example embodiment, the structure may comprise a concentric registration ring that is adhered to the film. The registration ring includes a central open hole portion through which infrared radiation may pass without occlusion. When the probe cover is applied to the probe, the probe contacts the ring. Since the ring is substantially non-stretchable, the ring prevents the film from further stretching over the probe. Further, in the preferred embodiment, the ring self-adheres to the film—maintaining the film in a prestretched, wrinkle-free condition.

The additional structure provided by the present invention helps to minimize the likelihood that the film will tear over the thermometer's probe tip. An additional benefit is that the structure reduces the surface adhesion of the film to the probe, improving or easing the probe cover ejection process after a measurement. Further, by pre-stretching the film during manufacturing with a highly repeatable process, the transmissivity of the film is inherently very consistent from one probe cover to the next.

BRIEF DESCRIPTION OF THE DRAWINGS

These and other features and advantages provided by the present invention will be better and more completely understood by referring to the following detailed description of preferred embodiments in conjunction with the drawings of which.

DETAILED DESCRIPTION OF PRESENTLY PREFERRED EXAMPLE EMBODIMENTS

Figures 1A, 1B, 1C, 1E:
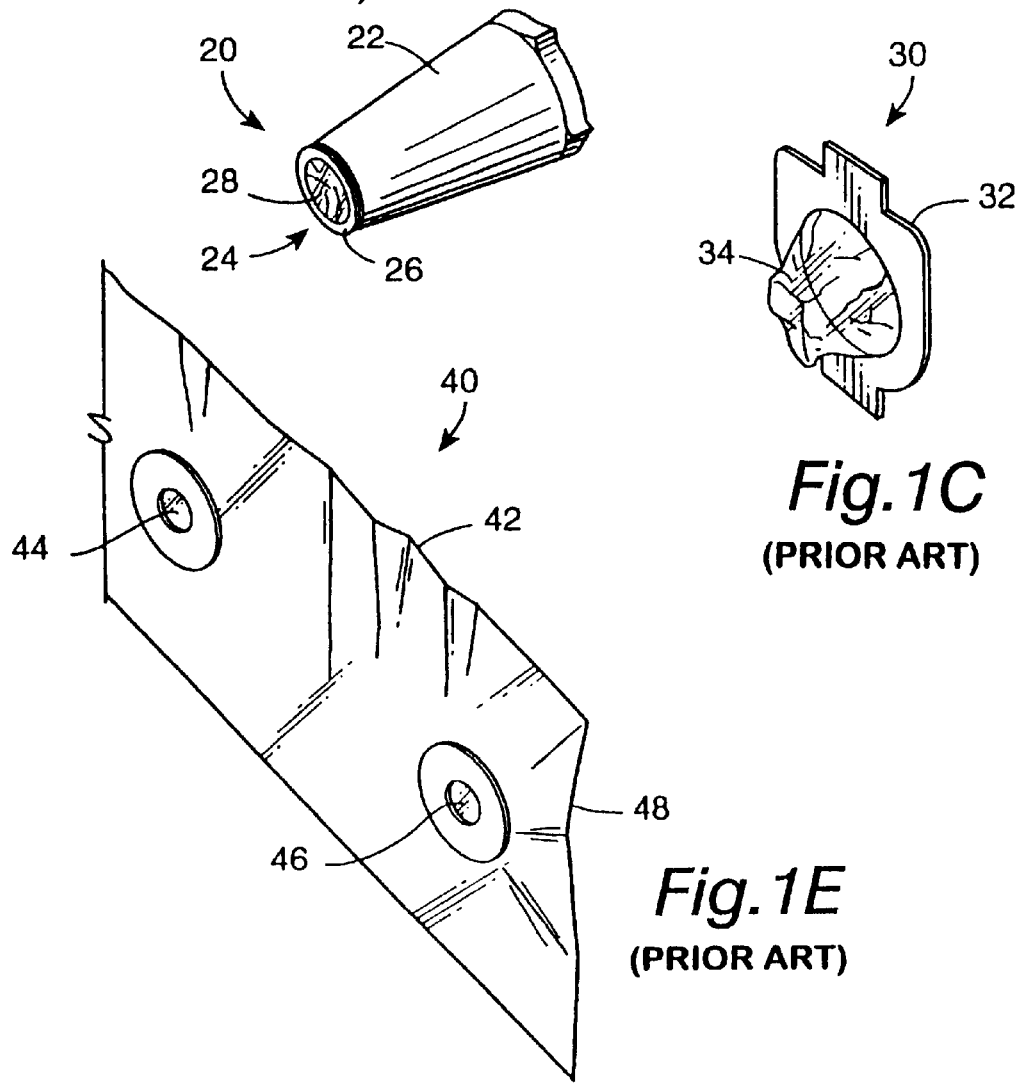
FIGS. 1A–1G show example prior art probe covers.
Figure 1D:
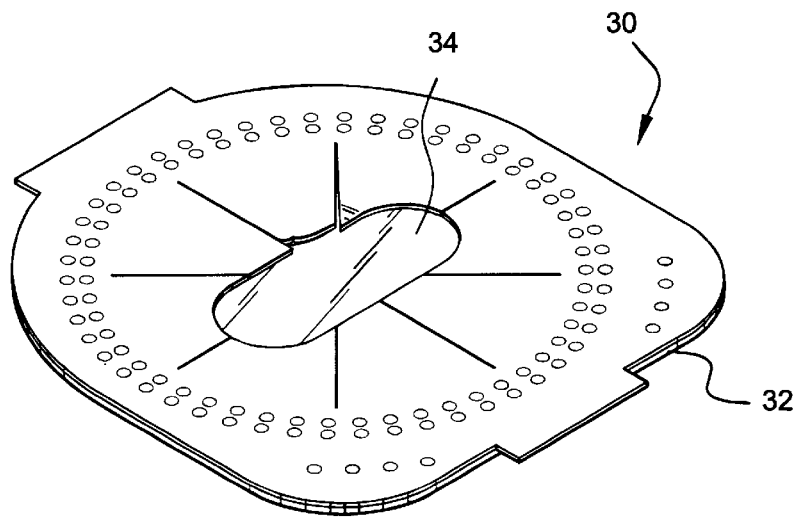
Figure 2A:
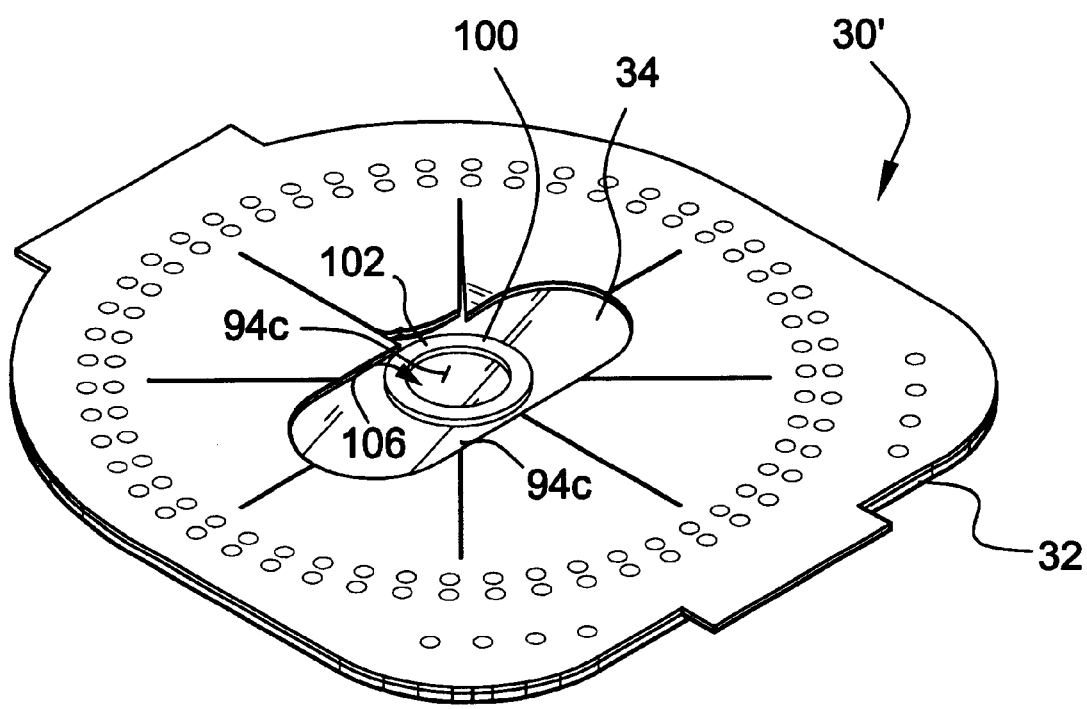
FIG. 2A shows an example probe cover including a further stretching prevention ring in accordance with the present invention.

FIG. 2A shows an example probe cover 30' in accordance with the present invention. The FIG. 2A probe cover 30' is similar or identical to the FIG. 1D prior art probe cover except for the addition of a, substantially non-stretchable structure 100 adhered to film 34. Film 34 in this example comprises a thin stretchable plastic polyethylene sheet or film that is substantially transmissive or transparent to infrared radiation. Structure 100 is adhered to film 34 in the area where the probe contacts the film. This additional structure 100 is designed so that it does not occlude infrared radiation from reaching the probe, while maintaining at least a part of film 34 in a prestretched, wrinkle-free condition and preventing that part of the film from stretching further.

In the FIG. 2A embodiment shown, structure 100 comprises a ring 102 adhered to the film 34. Ring 102 is made from a substantially non-stretchable material such as paper or cardboard for example, and may be self-adhered to film 34 using a conventional glue or other adhesive (e.g., applied to the ring before the ring is placed on film 34) that provides good adherence to plastic film. Ring 102 defines a central open hole portion 106 through which infrared radiation may pass without occlusion.

Figure 2B:
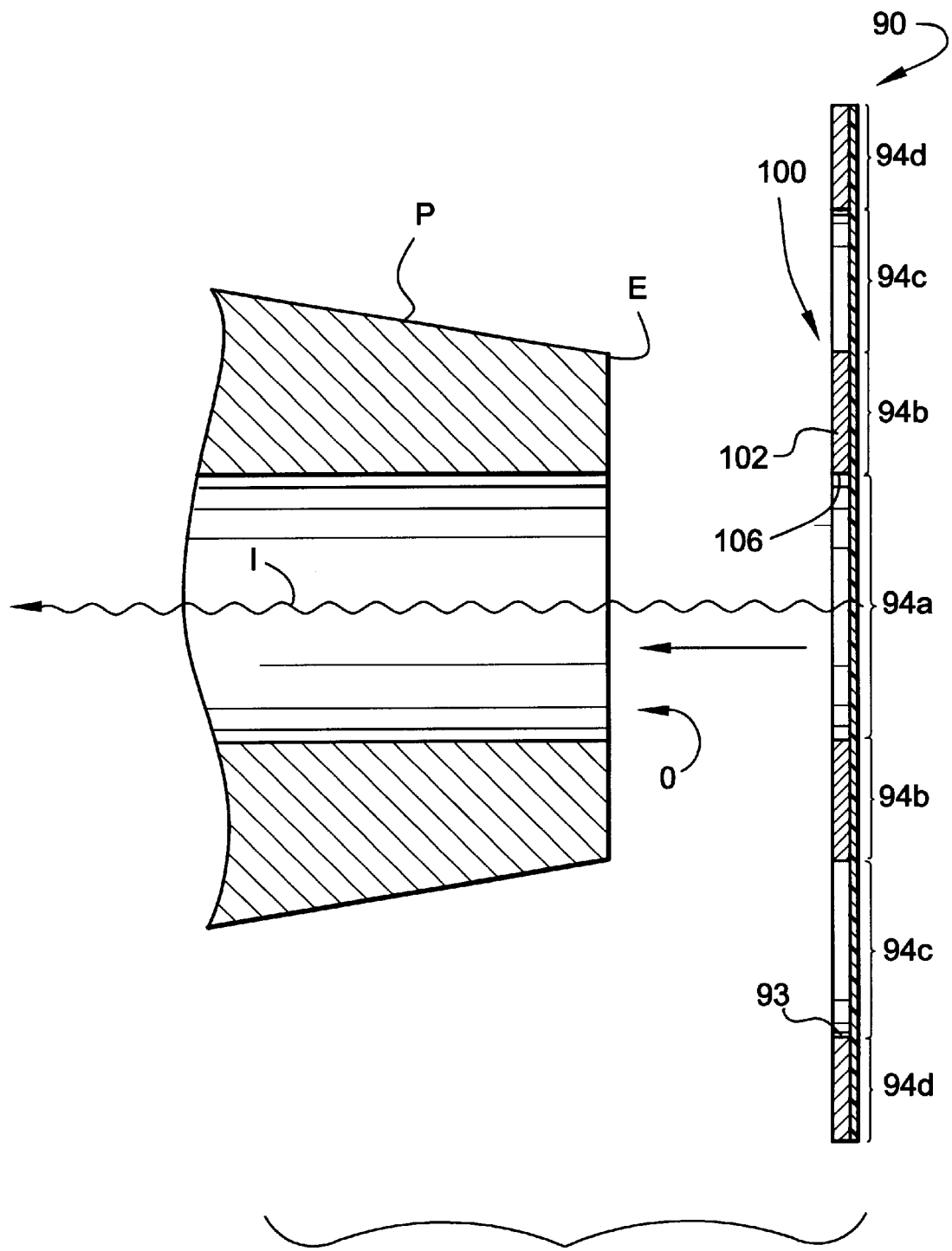
FIG. 2B shows the FIG. 2A example probe cover in cross-section in proximity to an example probe.

FIG. 2B shows the FIG. 2A probe cover 30' in cross-section in proximity to an example probe P. As can be seen in FIGS. 2A and 2B, ring 102 divides film into three portions in this example:

a film portion 94a within the ring, a film portion 94b adhered to the ring, and a film portion 94c outside the ring.

A further film portion 94d is adhered to the probe cover carrier 32 in this example.

Film 34 is prestretched before ring 102 is applied to film 34 so the ring can maintain film portion 94a in a prestretched, wrinkle-free condition. For example, ring 102 may be self-adhering, and may be extruded through a tube that moves into contact with and applies pressure to prestretch the film before applying the ring to the film. Ring 102 maintains film portion 94a in a prestretched condition without allowing it to stretch further—thus providing a uniform, infrared-transmissive interface that passes infrared radiation to a tympanic thermometer probe P with a substantially known amount of absorption and reflectivity that can be corrected for or otherwise taken into account in the same way across a large number of probe covers 30' manufactured in the same way from the same materials.

Ring 102 may be dimensioned and shaped to match the dimensions and shape of a probe end E (see FIG. 2B). As shown in FIG. 2B, ring 102 is preferably dimensioned and shaped to contact a corresponding circular forward end E of the tympanic thermometer probe P when the probe registers with the ring. As one example, ring 102 may have an outside diameter that is slightly less than the probe end E outside diameter, and an inside diameter that is slightly more than the probe lens/waveguide outside diameter (i.e., the diameter of a probe opening O through which infrared energy is to pass into the probe P).

Ring 102 may used as a registration guide for aligning the tympanic thermometer probe E with film 34. Ring 102 can provide an easy-to-see structure that a clinician can use to "aim" for and register probe end E with. For example, the clinician can be instructed to "aim" the probe end E so that it registers with ring 102—or some automatic loading mechanism can be used to register the ring and the probe end. Ring 102 and a corresponding circular area about the periphery of probe end E contact one another, and the hole 106 in the center of ring 102 registers with and does not occlude an opening O in probe end E for the passage of infrared radiation I into the probe P for quantification and measurement.

Figure 2C:
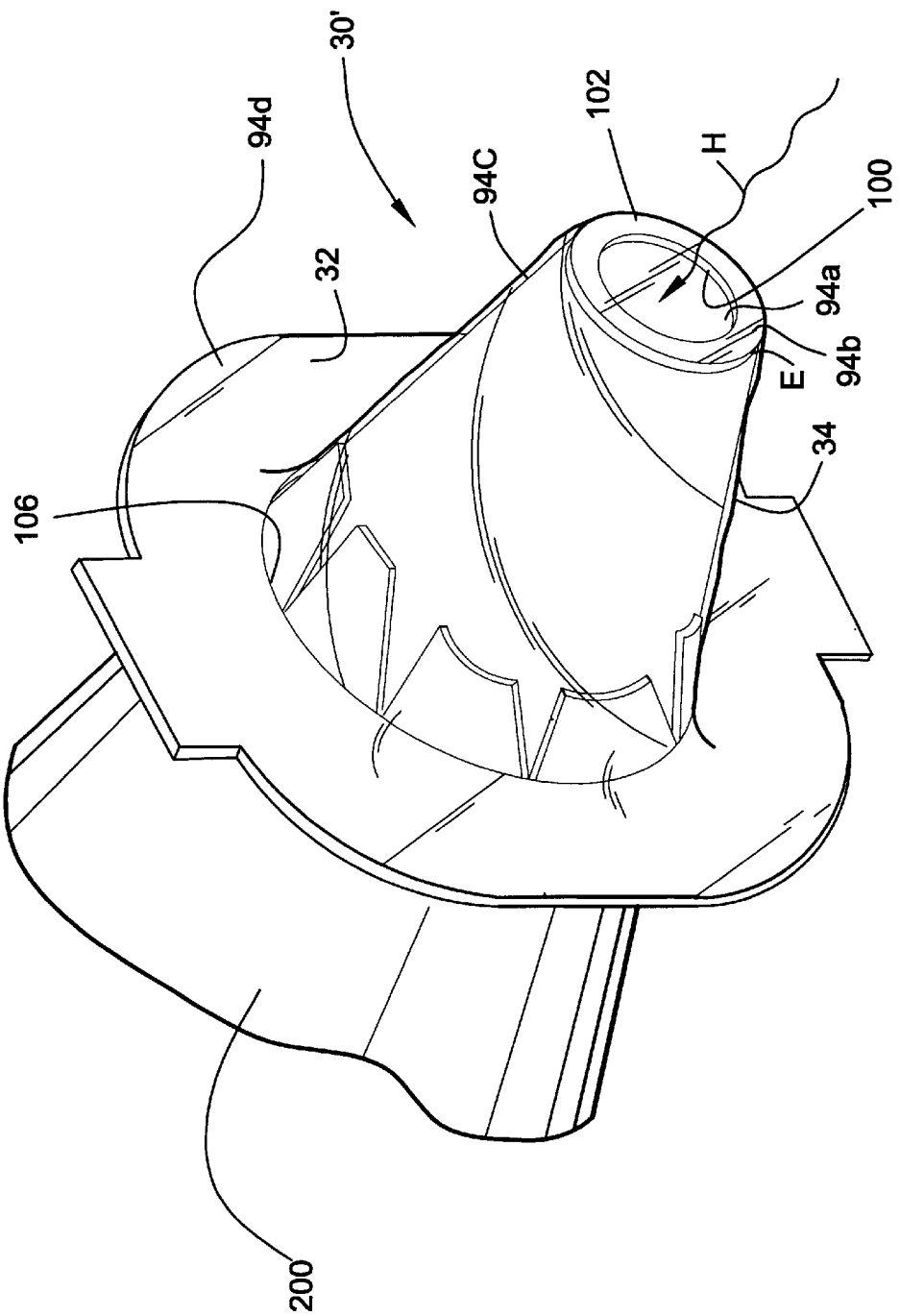
FIG. 2C shows the example probe cover of FIGS. 2A and 2B applied to a tympanic thermometer probe.
Figure 3:
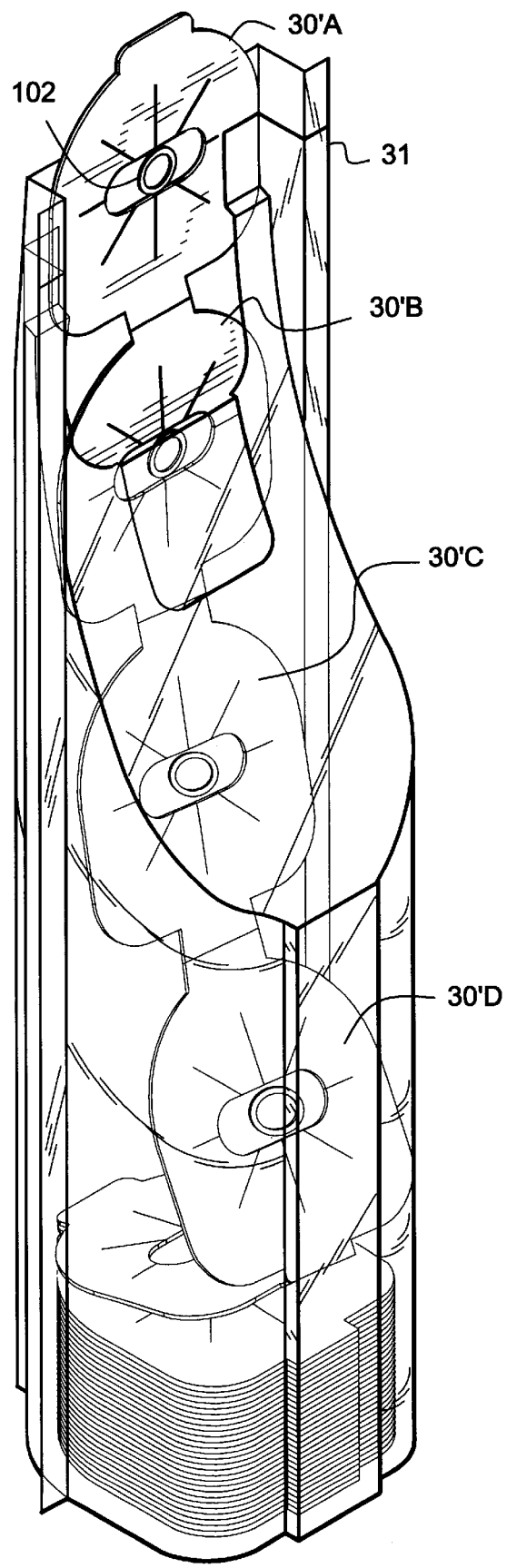
FIG. 3 shows the probe covers of FIGS. 2A and 2B stacked in a dispenser.

FIG. 2C shows the FIG. 2A probe cover 30' after it has been applied to probe P. The ring 102 maintains pre-stretched film portion 94a in its pre-stretched condition so that it transmits infrared energy I into probe opening O without interference from any wrinkles or other similar variations in the mechanical condition of film portion 94a that covers the probe opening. Ring 102 also prevents film portion 94a in front of the tympanic thermometer probe P from stretching further when probe cover 30 is applied to the thermometer—thus achieving the potential for higher accuracy by ensuring a uniform and consistent optically transmissive film thickness that does not vary much from one probe cover 30' to the next irrespective of the particular technique used by a clinician to apply the probe cover onto the probe P. Such repeatable consistency can be taken account of in the thermometer calibration process to achieve more accurate measurements.

As shown in FIG. 2C, film portion 94c may stretch further over the probe P in some designs. Ring 102 may assist in this process by providing a substantially planer contact point for probe end E to more uniformly transmit stretching force while minimizing the risk that the film 34 will tear during the application process. Whether or not film portion 94c stretches further upon application of the probe cover to the probe (and the degree of any such further stretching) depends on the particular probe cover design and mounting arrangement. But any such further stretching of film portion 94c is not for the purpose of removing structural characteristics in the film that might possibly interfere with measurement accuracy when the IR sensing probe P is inserted, nor is film portion 94c stretched over the probe forward end E. Stretching of film portion 94c does not affect the probe's optical transmission path because it is not involved in transmitting infrared signals I to the probe. The only portion of film 34 that is disposed over the probe's forward end E is film portion 94a—and ring 102 prevents that film portion 94a disposed over the probe forward end from stretching further while maintaining it in a prestretched condition. Thus, in this example, ring 102 may provide a non-uniform or profiled stretching of film 94 (that is, only film portion 94c that is not disposed over the probe forward end E can be further stretched)—and film portion 94a within ring 102 maintains the precise amount of pre-stretch applied to it during manufacturing without stretching further (and thus getting thinner) upon application of the probe cover 30' to the probe P.

In more detail, FIG. 2C shows probe end E contacting ring 102 when the probe cover 30' is applied to the probe P. Since ring 102 is substantially non-stretchable, the ring prevents the film portion 94a from stretching further over the probe or tearing when the film 34 is brought into contact with the probe portion E. Ring 102 can force proper alignment of the probe cover 30' to the thermometer—especially if the ring is made from a rigid or semi-rigid material and the ring's outside diameter is slightly less than the probe's inside diameter.

Any stretching of film portion 94c is along the dimension of a part of the probe wall away from the probe's forward end. Such further stretching brings ring 102 into snug contact with probe forward end E, but does not result in further stretching of film portion 94a over the probe forward end because, as mentioned above, ring 102 prevents film portion 94a from stretching further over the probe's forward end. Should such further stretching of film portion 94c cause tearing, this tearing is not likely to cause problems because it is likely to be noticed immediately (being on the side of the probe rather than at the probe end) and the torn portion may in any event never be inserted in or near the outer ear canal—thus reducing the likelihood of cross-contamination and/or exposure of any thermometer optical component to ear wax or other secretions.

Since film portion 94a is pre-stretched during the manufacturing process and is not unstretched at the time the probe cover is applied to the probe, there is no need to further stretch this film portion over the probe forward's end to remove structural characteristics in the film that might interfere with measurement accuracy. In fact, it is undesirable to further stretch this film portion 94a at time of application of probe cover 30' to probe P because the amount of further stretching may depend on the particular application technique used by a clinician to apply the probe cover to the probe, and this application technique thus introduces a variable factor that may possibly affect measurement and introduce error. Prevention by ring 102 of such further stretching helps to maintain a consistent and repeatable optically transmissive characteristic during temperature measurement from one probe cover specimen to another.

Figure 5:
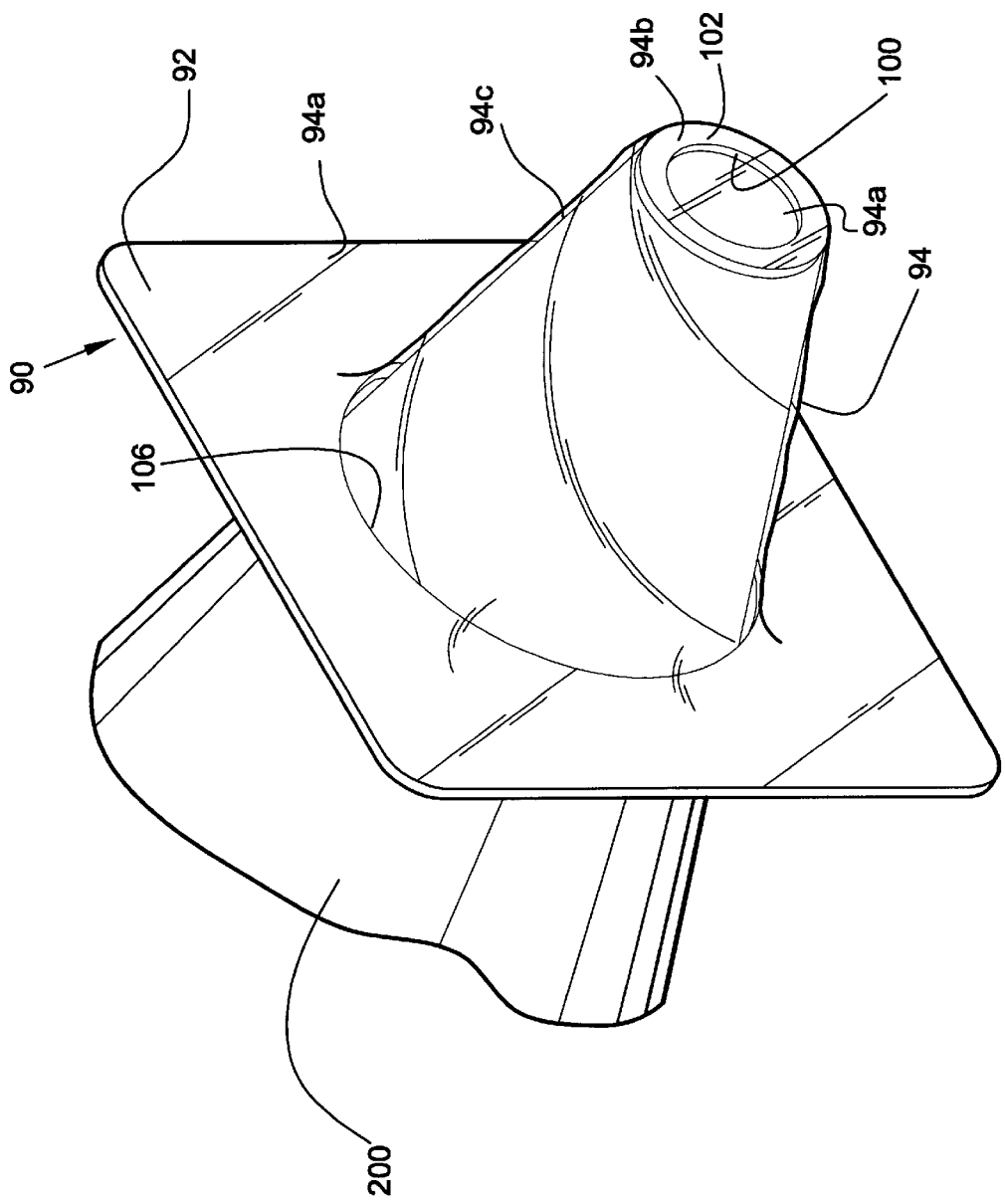
FIG. 5 is a perspective view of the probe cover of FIGS. 4A and 4B applied to a tympanic thermometer probe.

Probe cover 30' including ring 102 may be dispensed onto a tympanic thermometer probe P in a conventional fashion. As one specific example, ring 102 comprising a plastic washer of approximately 0.015" thickness (i.e., no more than probe cover carrier 32, 80) can avoid changing the stacking, dispensing and/or cartridge dynamics of conventional probe covers (see FIG. 5 showing a conventional Diatek cartridge 31 with stacked probe covers 30').

Once the disposable probe cover 30' has been applied to probe end E, the nurse or other caregiver inserts the covered probe P into the patient's outer ear and then presses a button to command the tympanic thermometer to make a measurement. The measurement time is usually very rapid—on the order of two seconds or less. Infrared radiation I emitted by the patient's ear tissue (e.g., the tympanic membrane) passes through prestretched film portion 94a and into probe opening O where it is transduced and converted into a temperature measurement using known techniques (see, for example, co-pending commonly-assigned application U.S. Ser. No. 09/089,417 entitled Tympanic Thermometer With Modular Sensing Probe, now allowed). The patient's temperature instantly shows on the instrument's display. The instrument may then be removed from the patient's ear, and the disposable cover 30' can be stripped off the instrument and discarded. Because film portion 94a is not further stretched over the probe end E and the probe end is in contact with ring 102 that is substantially non-stretchable, there is no great tendency of the film to adhere to the probe end E—encouraging easy and efficient stripping of the probe cover.

Figure 1F:
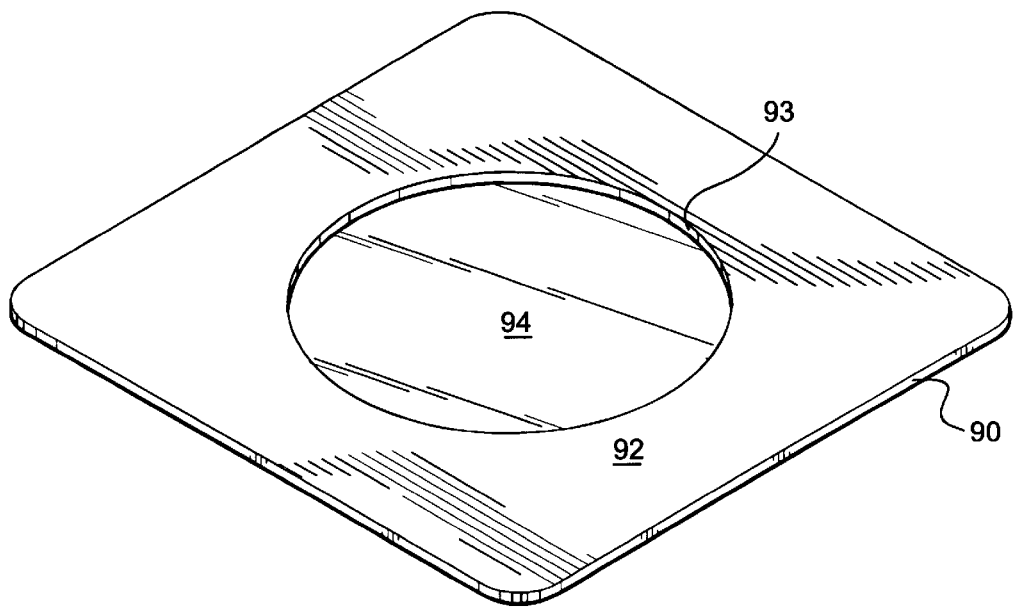
Figure 1G:
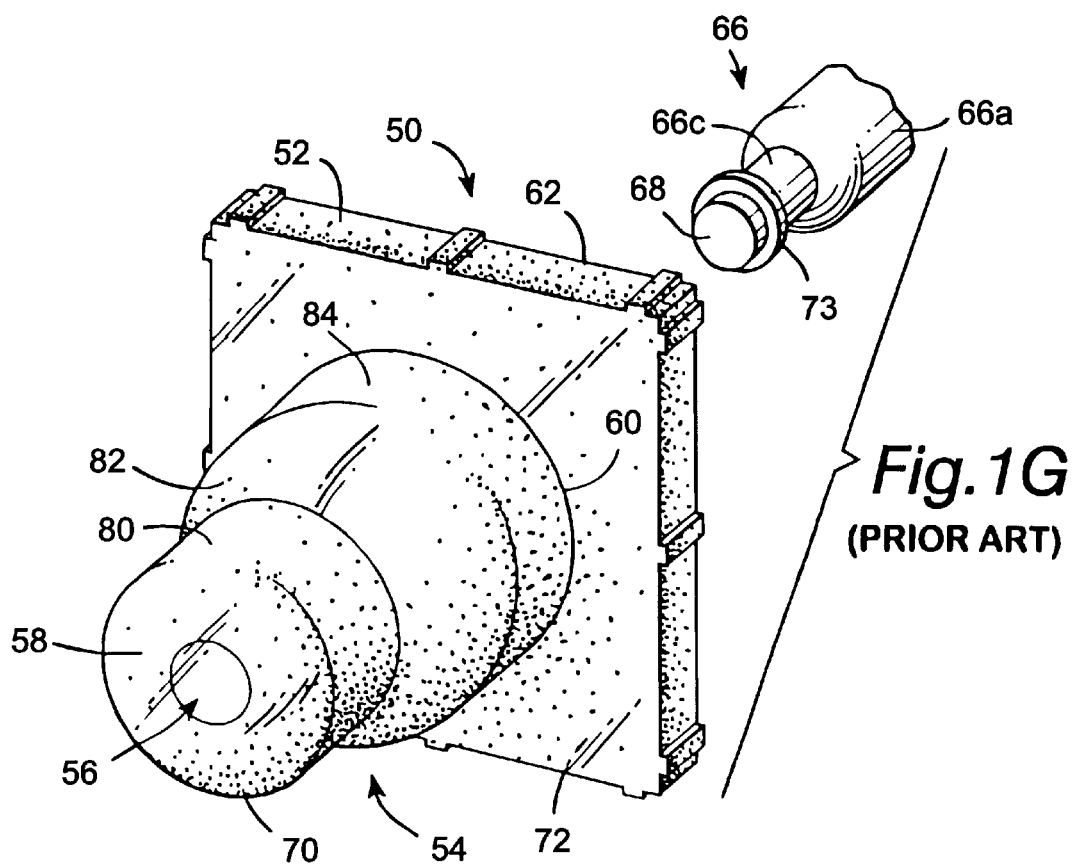

Ring 102 described above can be applied to existing manufactured probe cover designs or new designs. For example, application of ring 102 to existing probe cover designs such as the FIG. 1D and 1F designs can be accomplished by applying slight pressure to film 34 to create a surface tension, and then adhering the ring. In one example manufacturing process, a hollow extruding tube could be used to dispense and apply the rings 102. The probe cover carrier 32 could be retained in a workpiece, and the extruding tube could be brought into contact with film 34 in a precise way that applies a desired slight degree of prestretching to the film to establish a surface tension and eliminate wrinkles. A self-adhering ring 102 could then be dispensed through the hollow tube and adhered to the film 34—maintaining the film portion 94a within the circumference of ring 102 in a prestretched, wrinkle-free condition.

Raised Registration Ring Embodiment

Figure 4A:
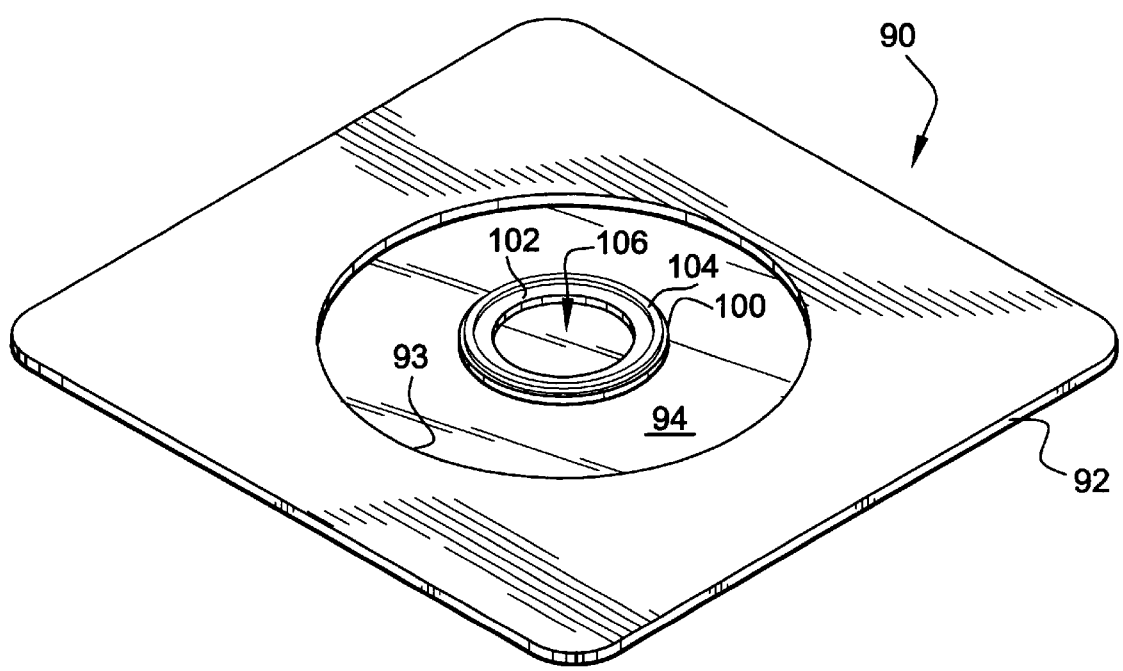
FIGS. 4A and 4B show another example of a probe cover including a further stretching prevention ring with a raised outer ring that registers with a corresponding probe slot.
Figure 4B:
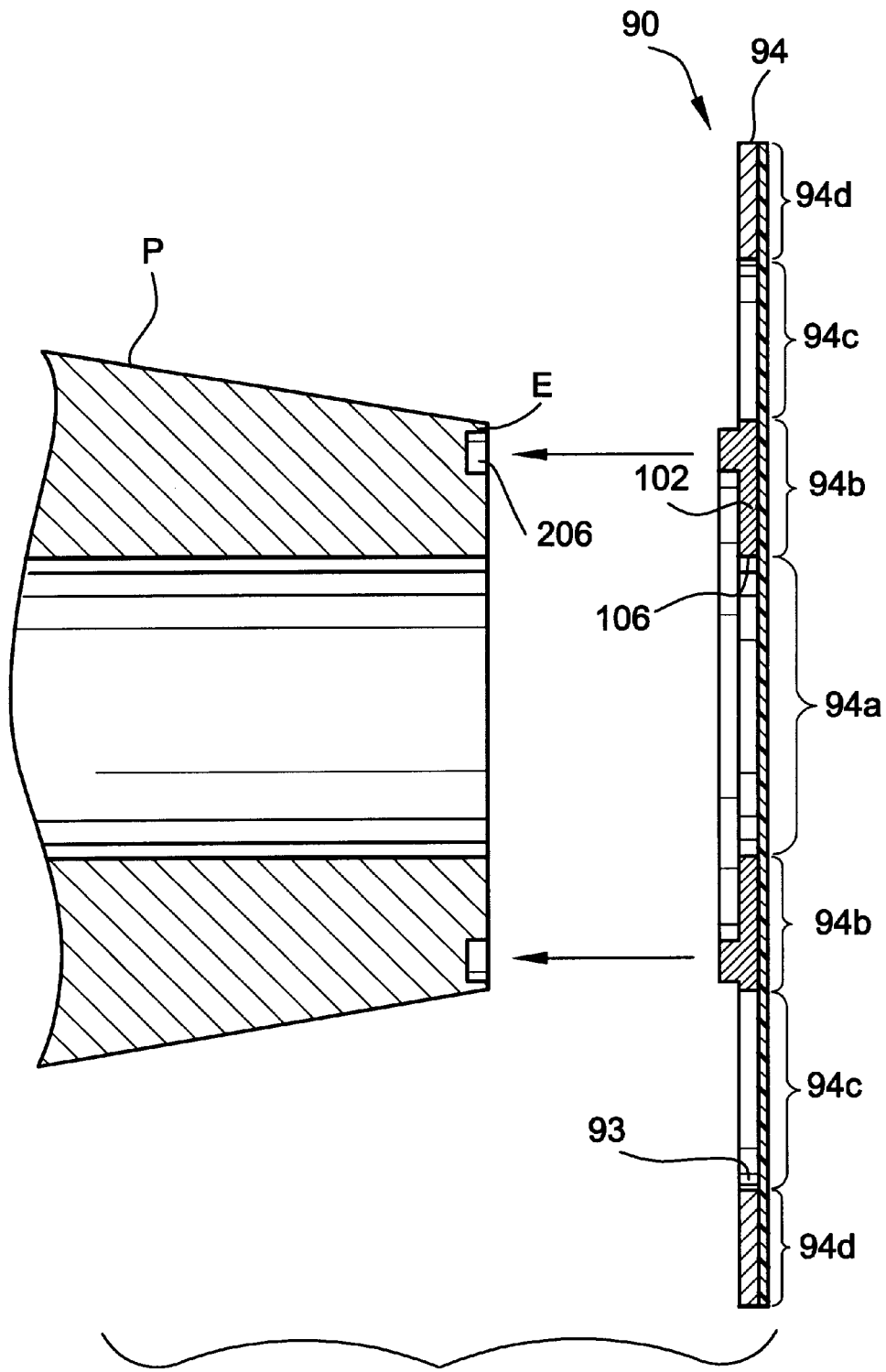

FIGS. 4A and 4B shows a further embodiment of structure 100 including a self-registration guide structure in the form of a raised outer washer ring 104. Structure 100 shown in FIG. 4A is, in this example, self-adhered to film 94 of the FIG. 1F prior art probe cover 90, but it could be used with the FIG. 1D prior art probe cover 30 or a variety of other prior art probe covers providing infrared-transmissive film or other protective sheaths. In this further embodiment, ring 102 has a raised outer washer ring 104. Raised outer washer ring 104 is dimensioned to mate with a corresponding groove 206 disposed around the periphery E of an example probe P (see FIG. 4B). Upon application of probe cover 30' to probe end E, raised outer washer ring 104 slides into corresponding probe groove 206 to provide a positive mating engagement between ring 102 and probe P. This mating engagement helps prevent ring 102 from sliding off probe P during the temperature measurement process—helping to ensure that the ring will not optically occlude the radiant heat flux falling upon the thermopile heat sensor (not shown) within probe P from the target under view.

The FIG. 4B cross-sectional view of the FIG. 2B ring 102 shows that outer washer ring 104 in this embodiment has a circular raised portion that positively engages with corresponding groove 206 defined about the circumference of probe end E. Surface ring 102 and outer washer ring 104 can be unitary or multi-piece molded or formed. For example, rings 102, 104 can comprise two different rings (one surface-bonded, the other raised), or they could comprise a unitary material such as paper, polyethylene, silicone, foam, plastic, etc. Such concentric rings 102, 104 can be adhered to the film 94 surface with adhesive, or molded or extruded into the film during the film manufacturing process. Rings 102, 104 may be single layered or multi-layered.

Example Breakway Embodiment

Figure 6:
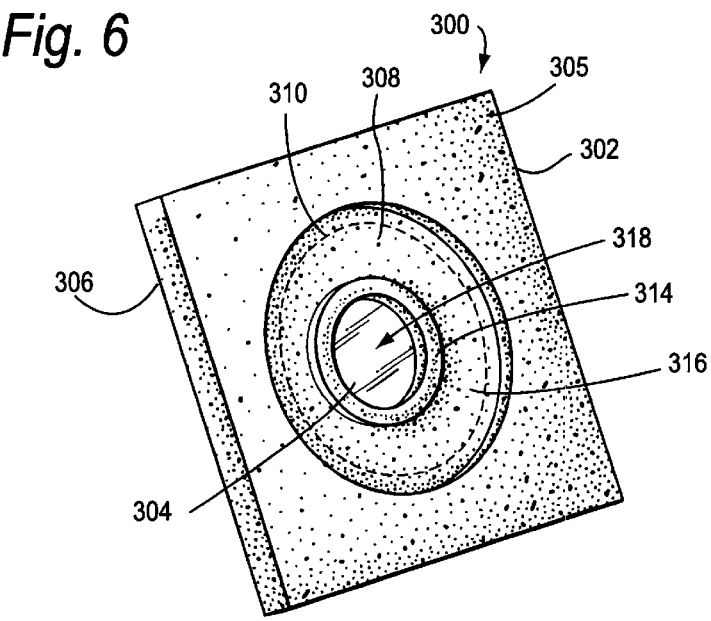
FIGS. 6 and 7 show different views of another example probe cover including a break-away portion.
Figure 7:
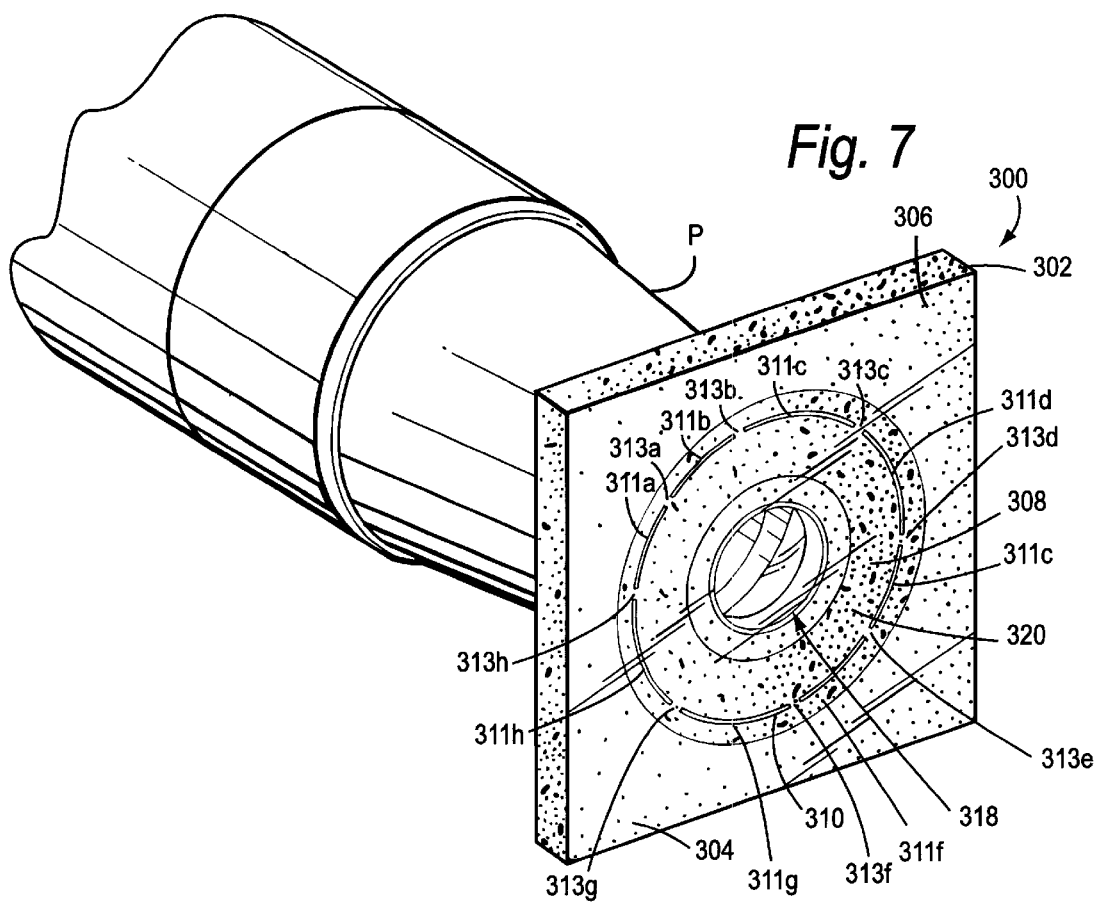

FIG. 6 shows a further embodiment of a probe cover 300 in accordance with the present invention. Probe cover 300 in this embodiment comprises a substantially plainer (flat) carrier 302 having a polyethylene or other stretchable film 304 adhered to a surface 306 thereof. Film 304 may be prestretched over surface 306 at time of manufacturing to provide a constantly-tensioned prestretched film.

Carrier 302 in this example is molded or otherwise formed to provide a central break-away portion 308. Break-away portion 308 is easily separable from the rest of carrier 302 by applying pressure from a thermometer probe P. For example, break-away portion 308 may be separably attached to the remainder of carrier 302 by a pre-cut slotted region 310 that allows the break-away portion 308 to easily separate from the remainder of carrier 302.

Break-away portion 308 provides an open ring structure 314 surrounded by a preferably cupped thinner region 316 on one side 305 of carrier 302 and a planer region 320 carrier side 306. Ring 314 is dimensioned to provide an opening 318 that allows infrared radiation to pass unimpeded into probe end opening O for transducing and temperature measurement. A substantially planer surface 320 surrounding ring 314 on carrier side 306 provides sufficient surface area to firmly adhere film 304 in a substantially prestretched condition over opening 318. Because of this firm adherence, ring 314 maintains film 304 in its prestretched condition, and prevents film 304 from further stretching as separable portion 308 is further pulled over probe end E.

Figure 8:
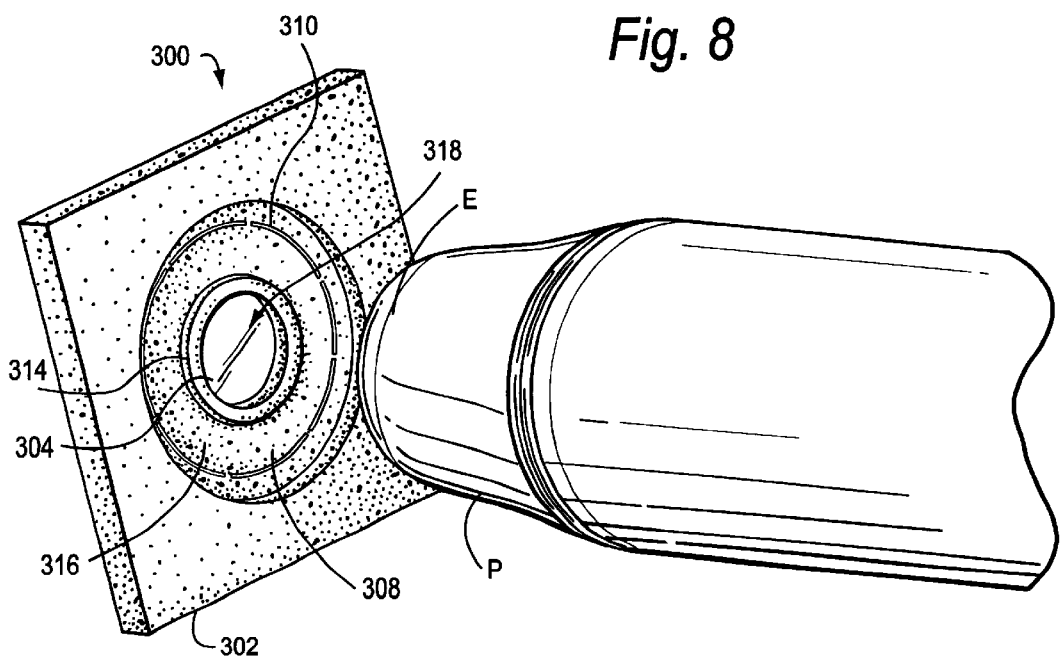
FIG. 8 shows the FIGS. 6–7 probe cover being applied to a probe.
Figure 9:
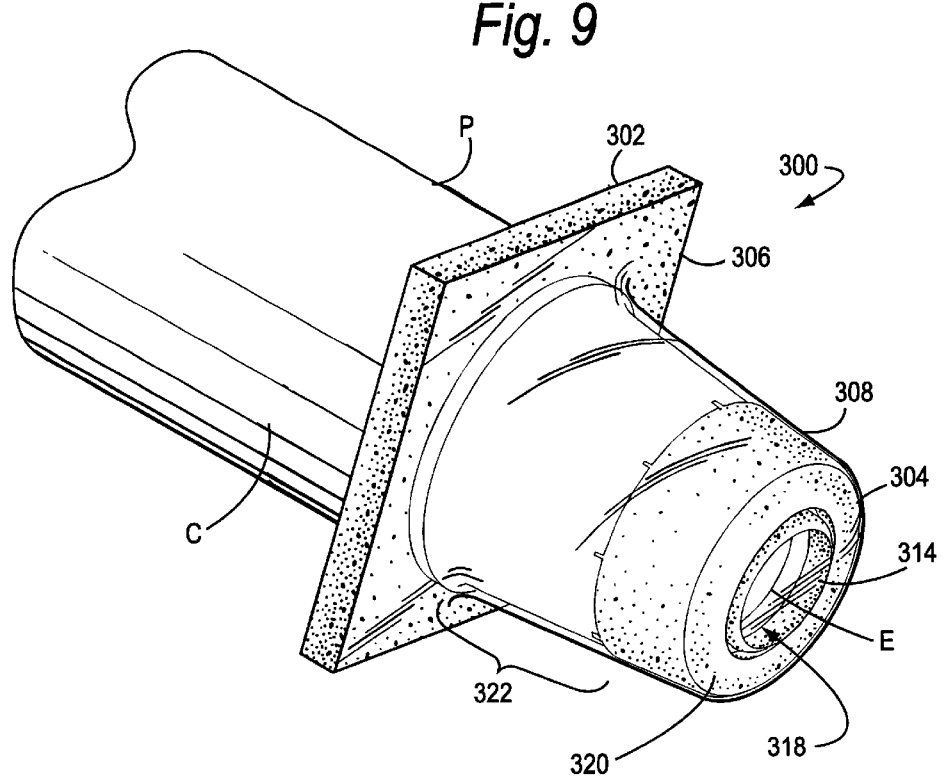
FIG. 9 shows the FIGS. 6–7 probe cover after application to a probe.

In this example, film 304 is firmly adherent to both break-away portion 308 and to the remainder of carrier 302 through a lamination or heat staking process that permits selective adhesion of the film to the carrier. This means that when break-away portion 308 separates from the rest of carrier 302, the portion of film 304 that does not adhere to breakaway portion 308 stretches as the breakaway portion separates from the remainder of the carrier. As shown in FIG. 8, this action allows the remainder of carrier 302 to slide down along the cylindrical circumference C of probe P with separable portion 308 remaining in contact with probe end E.

In one example arrangement, carrier 302 (including breakaway portion 308) is molded from a polyethylene or other closed-cell foam material to provide a degree of padding and thermal insulation during temperature measurement. However, carrier 302 could be made out of other materials (e.g., paper, silicone, etc.). Film 304 may comprise a one-thousandth of an inch thick sheet of plastic film (e.g., polyethylene or polypropylene) that is substantially transmissive to infrared energy within the frequency bands of interest to probe P. Film 304 may be applied to carrier 302 using a standard laminating process to pre-extruded carrier 302, or the film could be extruded with the carrier during fabrication of the carrier. Exemplary dimensions for carrier 302 are ¾"×¾"×75 thousandths of a inch thick, with breakaway portion 308 having a diameter of about ½ inches and a thickness of about 20 thousandths of an inch. Opening 318 may have a diameter of 0.2" and the outer diameter of ring 314 may be 0.26". Slots 310 may be cut by a cutting die that provides a ½-inch cut-through to substantially but not completely detach breakaway portion 308 from the remainder of carrier 302. For example, slots 310 may comprise 8 circumferential cuts 311 separated by tabs 313 each 10 thousandths of an inch thick.

A variation on the embodiment shown in FIGS. 6, 7, 8, and 9 is to form carrier 302 out of a material such as stretchable foam that stretches at the same rate as film 304. If carrier 302 stretches at the same rate as film 304, then there is no need for slots 310 to allow portion 308 to breakaway. Rather, portion 308 would stretch with the film 304 during application of probe cover 300 to probe end E, while ring 314 would continue to prevent the portion of the film across opening 318 from stretching further while maintaining that portion of the film in a prestretched condition. This would also allow the film to be extruded in place as well as to be laminated.

Although the embodiments shown in FIGS. 6–9 provide ring 314 on the "probe side" of film 304 so that the probe end E directly contacts the ring, it may also be possible to place the structure on the opposite side of the film so the foam ring contacts the patient's ear. This variation may be particularly advantageous if ring 314 is made of non-stretchable foam, for example.

Unitary Embodiment

Figure 10:
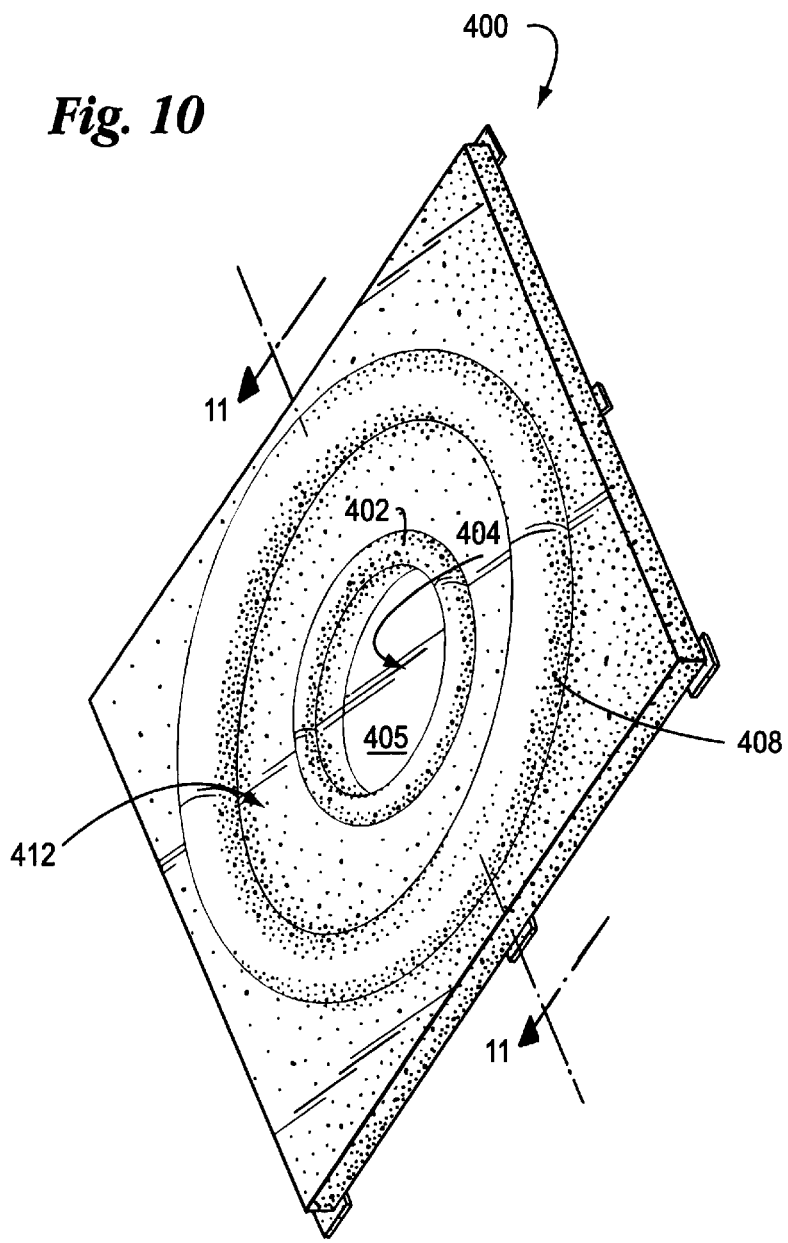
FIG. 10 shows another example probe cover including an integrally and stretching preventing structure formed film.
Figure 11:
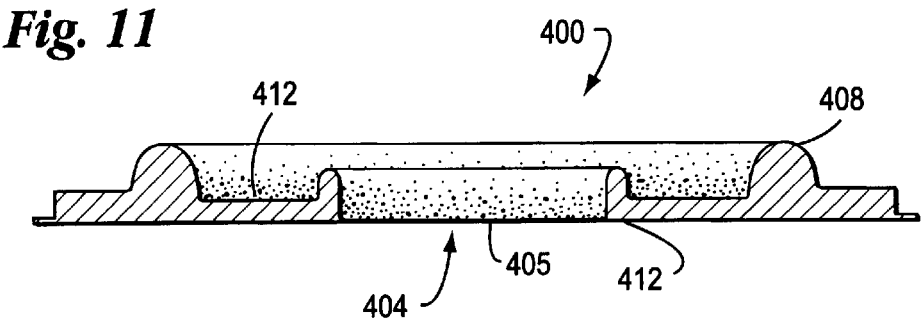
FIG. 11 is a cross-sectional view of the FIG. 10 probe cover.

FIG. 10 shows a further embodiment of a probe cover 400 provided in accordance with the present invention. Probe cover 400 in this example is formed as a unitary structure out of a flexible thermoplastic material or a flexible thermosetting material (e.g., silicone as one example). As best seen in cross-sectional FIG. 11, probe cover 400 is molded to include a ring 402 having a hole 404 defined therethrough for the passage of infrared energy I. Also integrally molded into probe cover 400 is a thin (e.g, 1 thousandths of an inch thick) sheet 405 of material that covers hole 404—thus providing a barrier for ear wax and other cross-contaminants.

Figure 13:
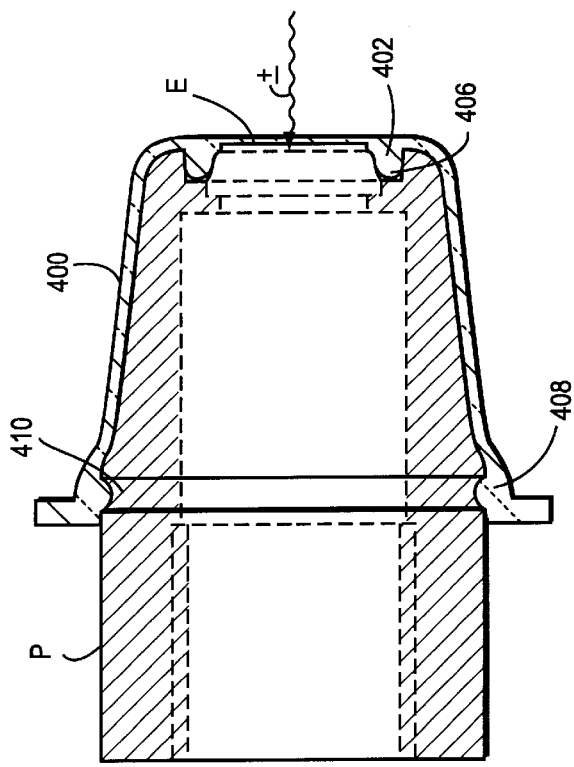
FIGS. 12 and 13 show the FIG. 10 probe cover applied to a probe.

Ring 402 is dimensioned to register with a groove 406 defined about the circumference of probe end E (see FIG. 13). When probe cover 400 is in place over probe end E, sheet 405 spans the forward probe end E to prevent the penetration of germs and other foreign substances while allowing infrared energy I to pass therethough with known loss and transmissivity characteristics. As in the embodiments described above, ring 402 is thick enough to be substantially non-stretchable—thus keeping sheet 405 in a tightly stretched condition across hole 404 without allowing the sheet to stretch further.

Figure 12:
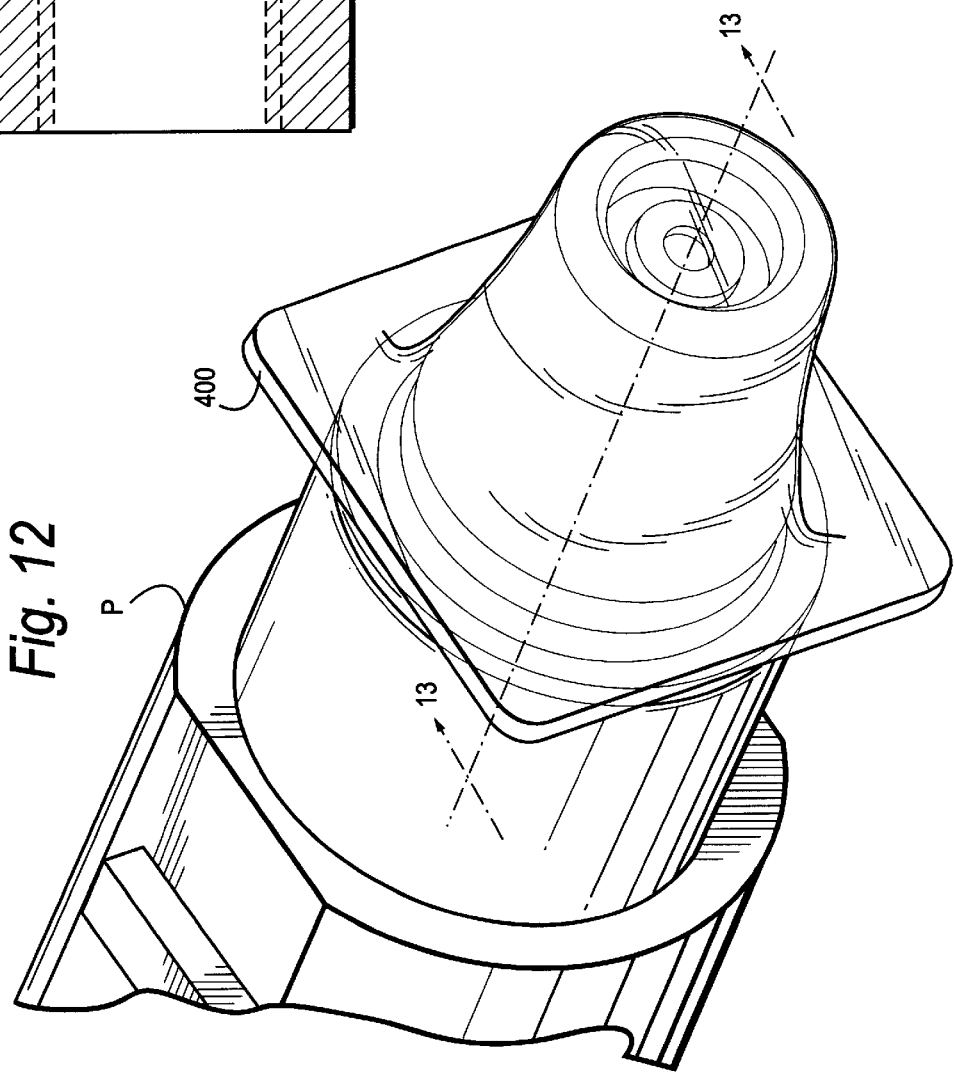
Figure 14:
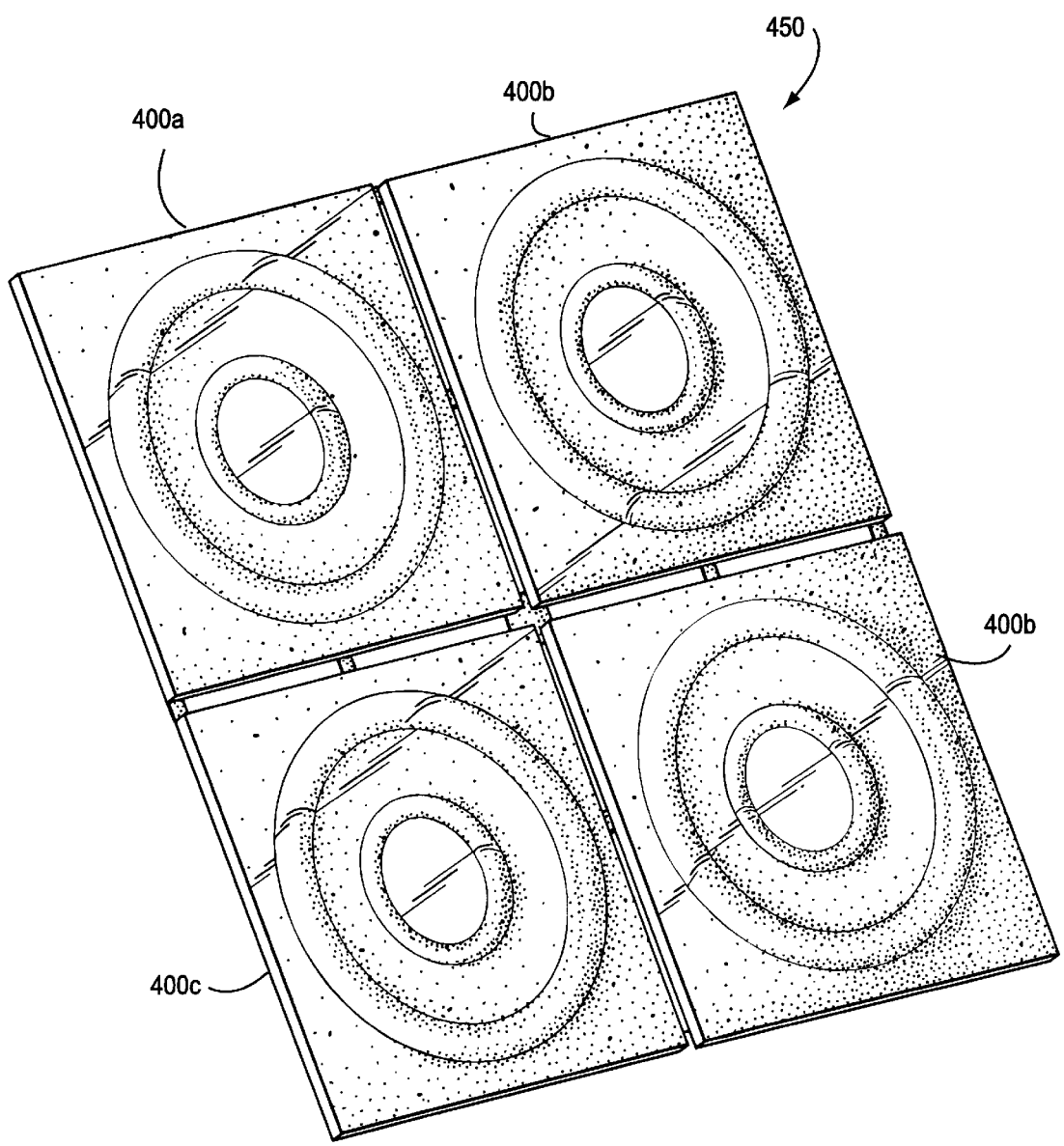
FIG. 14 shows a matrix of FIG. 10 probe covers.

Also formed in probe cover 400 is an outer ring 408 dimensioned to register with a further circumferential slot 410 defined on probe P some distance from probe end E (see FIG. 13). Outer ring 408 is used to retain probe cover 400 in place on probe P once it has been applied to the probe (see FIG. 13). A circular region 412 of stretchable, integrally molded material between rings 402, 408 is provided to span the distance between probe end slots 406, 410 when probe cover 400 is applied to probe end E (see FIGS. 12 & 13).

Probe cover 400 may be formed using a conventional transfer molding process involving the injection of thermosetting material such as silicone into a mold. Injection and compression molding might also be used depending on the particular thermosetting or thermoplastic material used. In one example implementation, sheet 405 may be 1–2 mils thick, ring 402 may be 20–40 mils thick, and ring 408 may be 50–60 thousandths of an inch thick.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the scope of the appended claims.

We claim:

1. A disposable probe cover for a tympanic thermometer including a probe having a distal end that, in use, receives infrared radiation emitted from a patient's ear tissue, said thermometer including an infrared radiation sensor that converts at least some of said received infrared radiation to an electrical signal for generating a temperature measurement, said disposable probe cover comprising:

a prestretched film that, in use, covers the probe distal end to minimize the risk of cross-contamination; and a stretching prevention structure mechanically coupled to the prestretched film, said stretching prevention structure, in use, substantially preventing at least a portion of the film disposed over the probe distal end from stretching.

2. A probe cover as in claim 1 wherein said structure, in use, does not occlude infrared radiation from reaching the sensor while maintaining at least said film portion in a prestretched, wrinkle-free condition.

3. A probe cover as in claim 1 wherein said film comprises a thin plastic film.

4. A disposable probe cover as in claim 1 wherein the structure comprises a circular ring.

5. A disposable probe cover as in claim 4 wherein said ring self-adheres to the film to maintain the film in a prestretched, wrinkle-free condition.

6. A disposable probe cover as in claim 4 wherein said ring is integrally formed with said film.

7. A disposable probe cover as in claim 4 wherein said ring is laminated to said film.

8. A disposable probe cover as in claim 4 wherein the ring includes a central open hole portion through which infrared radiation may pass without occlusion.

9. A disposable probe cover as in claim 4 wherein the ring is dimensioned to, in use, mate with a registration slot defined in the probe distal end.

10. A disposable probe cover as in claim 4 wherein the ring comprises one of the group consisting of paper, closed cell foam, and silicone.

11. A disposable probe cover as in claim 4 wherein the ring comprises non-stretchable plastic.

12. A disposable probe cover as in claim 1 wherein the structure includes a raised ring portion that, in use, mates with a groove defined in the probe.

13. A disposable probe cover as in claim 1 further including a body portion, said film adhering to said body portion, said structure being separate from said body portion.

14. A disposable probe cover as in claim 1 wherein said structure divides said film into first and second sections, said first section, in use, being stretched to a different degree than said second section.

15. A disposable probe cover for a tympanic thermometer, said thermometer of the type including a probe having a forward end, said probe receiving infrared radiation emitted from a patient's ear tissue, said thermometer including an infrared radiation sensor that converts at least some of said received infrared radiation to an electrical signal, said thermometer further including electronics that generate a temperature measurement based on said electrical signal, said disposable probe cover comprising:

a film having at least a prestretched portion for covering the probe forward end; and a stretching prevention structure mechanically coupled to the film, said stretching prevention structure, in use, not substantially occluding infrared radiation from reaching the sensor while preventing at least said film portion from stretching upon application of the probe cover to the probe forward end.

16. A disposable probe cover for a tympanic thermometer comprising:

a body portion defining an opening;

a prestretched plastic film over said opening; and a stretching prevention structure coupled to the plastic film, said stretching prevention structure, in use, substantially preventing at least a portion of said plastic film from stretching due to interaction between the probe cover and the tympanic thermometer.

17. A probe cover as in claim 16 wherein said structure comprises a self-adhering washer.

18. A probe cover as in claim 16 wherein said structure is integral with the plastic film.

19. A probe cover as in claim 16 wherein said structure comprises a non-stretchable layer disposed on the plastic film that prevents said above-mentioned plastic film portion from stretching over a tympanic thermometer probe forward end while allowing a further portion of said plastic film to stretch further over a further part of the tympanic thermometer other than said probe forward end.

20. A disposable probe cover for a tympanic thermometer that senses infrared radiation in an external ear canal of a patient via an IR sensing probe, the IR sensing probe having a forward end and the thermometer containing an IR sensor spaced from said forward end, the disposable probe cover comprising:

a stretchable thin film membrane made of a material which is substantially transparent to IR radiation over a predetermined range of wavelengths;

a body portion having an opening sized for having the IR sensing probe inserted therethrough, the thin film membrane prestretched across the opening in the body portion; and a further structure coupled to said thin film membrane, said further structure maintaining at least a portion of said thin film membrane in a prestretched condition to remove structural characteristics in the membrane that would interfere with measurement accuracy once the IR sensing probe is inserted through said opening while substantially preventing said thin film membrane portion from stretching due to interaction between said probe forward end with said disposable probe cover.

21. A disposable probe cover as in claim 20 wherein the stretching prevention structure comprises a substantially non-stretchable ring.

22. A disposable probe cover for a tympanic thermometer of the type including a probe forward end, the probe cover comprising:

a body portion defining an opening and having an infrared-transmissive material prestretched over said opening, said body portion, in use, being applied over the probe forward end, said infrared-transmissive material defining an area that, in use, covers the probe forward end and allows infrared radiation of at least certain wavelengths to reach the probe forward end; and a stretching prevention structure integrally formed with said infrared-transmissive material, said stretching prevention structure, in use, substantially preventing at least said infrared-transmissive material area from stretching when said body portion is applied over the probe forward end.

* * * * *